(12) United States Patent
Kim et al.

(10) Patent No.: US 9,646,313 B2
(45) Date of Patent: May 9, 2017

(54) GESTURE-BASED TAGGING TO VIEW RELATED CONTENT

(75) Inventors: Eun Hyung Kim, Issaquah, WA (US);
Neal Osotio, Sammamish, WA (US);
John C. Wyss, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/324,435

(22) Filed: Dec. 13, 2011

(65) Prior Publication Data
US 2013/0151339 A1 Jun. 13, 2013

(51) Int. Cl.
*G06Q 30/02* (2012.01)
*G06F 17/30* (2006.01)

(52) U.S. Cl.
CPC ......... *G06Q 30/02* (2013.01); *G06F 17/3082* (2013.01)

(58) Field of Classification Search
CPC ...... G06F 1/00; G06F 17/302; G06F 17/3082; G06F 3/04883; G06Q 30/02
See application file for complete search history.

(56) References Cited

U.S. PATENT DOCUMENTS

| | | | |
|---|---|---|---|
| 5,687,254 A * | 11/1997 | Poon | G06K 9/00429 382/187 |
| 5,889,946 A | 3/1999 | FitzPatrick | |
| 6,616,533 B1 | 9/2003 | Rashkovskiy | |
| 8,179,604 B1 * | 5/2012 | Prada Gomez et al. | 359/630 |
| 8,306,977 B1 * | 11/2012 | Gildfind | 707/734 |
| 8,379,098 B2 * | 2/2013 | Rottler | G06F 3/04883 348/211.6 |
| 2004/0006509 A1 | 1/2004 | Mannik | |
| 2006/0136406 A1 | 6/2006 | Reponen | |
| 2006/0271953 A1 | 11/2006 | Jacoby et al. | |
| 2007/0186171 A1 | 8/2007 | Junuzovic | |
| 2008/0005074 A1 | 1/2008 | Flake et al. | |
| 2008/0034295 A1 | 2/2008 | Kulas | |
| 2008/0091548 A1 | 4/2008 | Kotas et al. | |
| 2008/0126191 A1 | 5/2008 | Schiavi | |
| 2008/0184121 A1 | 7/2008 | Kulas | |

(Continued)

FOREIGN PATENT DOCUMENTS

| CN | 102124463 A | 7/2011 |
|---|---|---|
| JP | 2010039592 A | 2/2010 |

(Continued)

OTHER PUBLICATIONS

"A Mobile Extensible Architecture of Implementing Ubiquitous Discovery Gestures Based on Object Tagging", by Simone Mora, Norwegian University of Science and Technology, Jul. 2009.*

(Continued)

*Primary Examiner* — Pan Choy
(74) *Attorney, Agent, or Firm* — Shook, Hardy & Bacon L.L.P.

(57) ABSTRACT

Computer-readable media, computer systems, and computing devices for enabling a user to view content related to an item within media content is provided. In one embodiment, a tagging gesture that indicates a user interest in an item presented within media content displayed to the user is detected. Such a tagging gesture can define a region of displayed content having the item. In response to detecting the tagging gesture, an advertisement provided by a third party that is related to the item is presented.

20 Claims, 17 Drawing Sheets

(56) References Cited

U.S. PATENT DOCUMENTS

| | | | |
|---|---|---|---|
| 2008/0255961 | A1 | 10/2008 | Livesey |
| 2009/0119572 | A1* | 5/2009 | Koivunen .................... 715/206 |
| 2009/0182644 | A1 | 7/2009 | Panagopulos et al. |
| 2009/0319181 | A1* | 12/2009 | Khosravy ............. G01C 21/20 701/532 |
| 2010/0042932 | A1 | 2/2010 | Lehtiniemi et al. |
| 2010/0289753 | A1 | 11/2010 | Coddington et al. |
| 2010/0306713 | A1* | 12/2010 | Geisner ................ G06F 3/0481 715/863 |
| 2011/0047517 | A1* | 2/2011 | Lee .................. G06F 17/30265 715/863 |
| 2011/0131605 | A1 | 6/2011 | Pratt et al. |
| 2011/0137753 | A1 | 6/2011 | Moehrle |
| 2011/0197164 | A1* | 8/2011 | Ahn ..................... G06F 3/0488 715/835 |
| 2011/0202603 | A1 | 8/2011 | Mate et al. |
| 2011/0265003 | A1 | 10/2011 | Schubert |
| 2012/0131454 | A1* | 5/2012 | Shah ............................ 715/702 |
| 2013/0027608 | A1 | 1/2013 | Belisomi et al. |

FOREIGN PATENT DOCUMENTS

| | | |
|---|---|---|
| TW | M392404 U | 11/2010 |
| WO | 2010141939 A1 | 12/2010 |
| WO | 2011079408 A1 | 7/2011 |

OTHER PUBLICATIONS

"Characterizing Changes in Parent Labeling and Gesturing and Their Relation to Early Communicative Development", by Laura L. Namy et al., F. Child Lang 31 (2004), pp. 821-835; Cambridge University Press.*

"Content-based Multimedia Information Retrieval", by Michael S. Lew, In ACM Transactions of Multimedia Computing, Communications, and Applications, Feb. 2006.*

"Object Detection Using the Statistics of Parts", by Henry Schneiderman and Takeo Kanade, International Journal of Computer Vision 56(3), 151-177, 2004.*

"Accurate Tracking of Objects Using Level Sets", by Nalin Pradeep Senthamil, Aug. 2009, Graduate School of Clemson University.*

"A Symbol Grounding Problem of Gesture Motion Through a Self-Organizing Network of Time-varying motion images", by Mukai et al., Tsukuba Research Center, Real World Computing Partnership, Japan. IEEE 1998.*

"A Universal Multimodal Remote Control Device for Home Appliances", by Gang Pan et al., Department of Computer Science, Zhejiang University, China, Springer-Verlag London, Mar. 2010.*

PCT ISR, mailed Mar. 29, 2013, U.S. Appl. No. 13/324,435, 12 pp.

Sohn, et al., "Circle & Identify: Interactivity-Augmented Object Recognition for Handheld Devices", In Proceedings of the 18th annual ACM symposium on User Interface Software and Technology, Oct. 23-27, 2010, pp. 107-110.

Hung, Ginny, "Reimagining Mobile Search: Introducing Yahoo!® Sketch-a-Search™ and Yahoo! Search for the iPhone®", 6 pp., Published on: Mar. 23 , 2010, Available at: http://ymobileblog.com/blog/2010/03/23/reimagining-mobile-search-introducing-yahoo%C2%AE-sketch-a-search%E2%84%A2-and-yahoo-search-for-the-iphon%C2%AE-2/.

"Bounding Box, Radius, and Polygon Search", Retrieved on: Oct. 11, 2011,11 pp. Available at: http://msdn.microsoft.com/en-us/library/cc451895.aspx.

"First Office Action issued in Chinese Patent Application No. 201210537861.4", Mailed date: Feb. 25, 2015, 11 Pages.

"Search Report issued in Chinese Patent Application No. 201210537861.4", Dated: Jan. 31, 2015, 2 pages.

"Supplementary Search Report Received for European Patent Application No. 12857559.4", Mailed Date: Aug. 14, 2015, 7 Pages.

Notice of Allowance dated Apr. 7, 2016 in Chinese Patent Application No. 201210537861.4, 2 pages.

Search Report Issued in Chinese Patent Application No. 201210537861.4 dated Oct. 9, 2015, 2 Pages.

Second Office Action Issued in Chinese Patent Application No. 201210537861.4 dated Oct. 28, 2015, 8 Pages.

"Office Action Issued in Japanese Patent Application No. 2014-547270", Mailed Date: Aug. 23, 2016, 3 Pages.

Notice of Allowance dated Oct. 18, 2016 in Taiwanese Patent Application No. 101140992, 2 pages.

Taiwan Office Action dated Jun. 27, 2016 and Search Report dated Jun. 16, 2016 for Taiwan Patent Application No. 101140992, 11 Pages.

"Office Action Issued in Japanese Patent Application No. 2014-547270", Mailed Date Dec. 16, 2016, 2 Pages.

* cited by examiner

GESTURE-BASED TAGGING TO VIEW RELATED CONTENT

BACKGROUND

In order to find content related to an item displayed within media content presented to a user, the user often makes use of a search service. Exemplary Internet search engines are well known in the art, for example, a commonly known commercial engine is the BING search engine provided by Microsoft Corporation of Redmond, Wash. Generally, upon a user viewing an item of interest within displayed media content, to identify any related content, a user initially opens a web browser and navigates to a home page associated with the particular search service. Thereafter, the user can enter a search query to obtain desired search results, for example, via a search box provided by the search service. Such a search process can be time consuming and inefficient.

SUMMARY

This summary introduces concepts of gesture-based tagging to view content related to an item of interest within media content, which is further described below in the Detailed Description. This summary is not intended to identify essential features of the claimed subject matter, nor is it intended for use in limiting the scope of the claimed subject matter.

This application describes example embodiments of facilitating viewing content related to an item presented within media content. In one example embodiment, a user may view media content having items that can be tagged. Accordingly, a display screen associated with a user device may display some media content, such as a video. Using a gesture, the user may provide an indication that he or she is interested in a particular item of the media content. In response to indicating interest in an item, content related to the item can be presented to the user such that the user can readily view such related content (e.g., an advertisement, a deal, item information, a suggestion or recommendation, etc.). In some implementations, the content related to a particular item is selected in accordance with the context of the item and/or user data.

BRIEF DESCRIPTION OF THE DRAWINGS

Embodiments of the invention are described in detail below with reference to the attached drawing figures, wherein.

DETAILED DESCRIPTION

Overview

Figure 1:
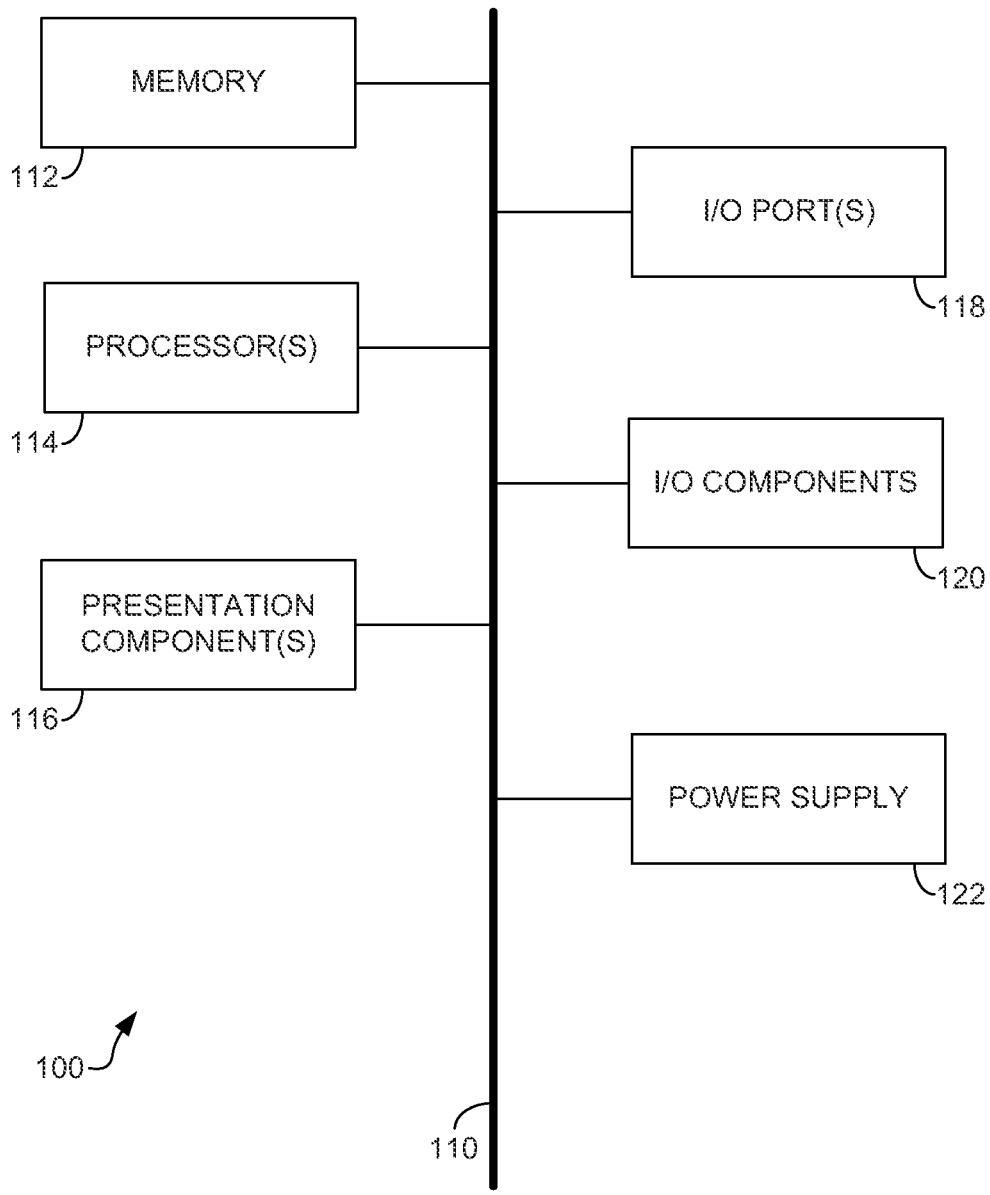
FIG. 1 is a block diagram of an exemplary computing device suitable for implementing embodiments of the invention.

Typically, when a user wants to search for certain information related to an item within media content the user is viewing, the user opens a web browser and connects with a search service. The user may query a search engine by entering a search query. Such a search query may be entered via, a search box which is integrated with a web browser and/or webpage or run with the web browser as a toolbar, or through a separate application that uses the web browser as a platform to complete a search. In either case, the user manually enters the search query, either by typing or by cutting and pasting a search query. Other existing technologies may allow a user to input a search query by activating a voice recognition function of the user's device, if available, to input voice commands and/or voice inputs, which are converted into text by a search application of the user's device or the search service.

In response to receiving the search query, the search service may return and present search results to the user on a results page. If the user wants to modify the search, the user may enter a modified search query into the text box and submit the modified search query to the search engine, which then returns new search results to the user. Once the user finds the desired information, he or she then exits the search service and returns to viewing the media content that he/she was originally viewing. Should the user need to refer to the search results or perform another search, the user must switch back and forth between viewing the media content and performing a search to identify content related to the media content being viewed, thus disrupting his or her media content viewing.

The situation becomes even worse if a device used by the user has limited capability or no capability of running multiple applications simultaneously. These problems are especially disruptive on mobile devices, which often do not allow a user to simultaneously view media content and perform an Internet search.

For example, a user may be viewing a video having a particular bat in which the user is interested. The user, however, may not know the brand of the hat or a location at which to buy the hat and, therefore, may search for the hat via the Internet. The user may, for example, open a web browser, go to a web page hosted by a search engine, enter a query including information about the hat (e.g., the actor wearing the hat, the title of the video in which the hat was provided, the color of the hat, the style of the hat, etc.) into a search box provided by the web page and submit the query to the search engine. Alternatively, the user may input the relevant hat information to a search application through voice commands and/or voice inputs. Given a small display, lack of a physical keyboard and/or voice recognition capability of the mobile device, however, the user may find it difficult to perform this search process. The situation may become even worse if details related to the hat are unknown. In such a case, the user might guess as to details, such as the hat manufacturer, and may thereby obtain incorrect information. Alternatively, the user might need to perform various searches in order to obtain desired information about the hat, such as the manufacturer of the hat.

In another example, a user may be viewing media content that includes an item of which the user is interested. The user may want to conduct a search for the item. To conduct the search, the user may need to know how to describe the item and provide a textual description of the image to a search engine, similar to the search process described above. Alternatively, the user may first find a similar image and save the similar image to local memory of the device and then upload the similar image to a search engine that allows content-based image retrieval. In both cases however, the user is required to go through a number of steps in order to perform the search.

This disclosure describes gesture-based tagging of items within media content to enable a user to view content related to an item. Such gesture-based tagging allows a user to view content (i.e., data or information) related to an item of interest that is presented in media content being viewed by the user in response to a gesture provided by the user. Generally, a user device displays media content to a user via a display screen. Such media content may be any media content that can be presented via a user device. For example, the user device may play a video and/or an audio to the user. The user device may subsequently detect a gesture from the user that indicates an intent to view content related to a particular item. In some cases, the user device may detect a gesture from the user that defines or designates an item within the displayed content on the display. The gesture may include, but is not limited to, touch input to a touch screen or touch pad of the user device, a body motion detected by an image capture device of the user device, and/or a motion of a cursor controlled by a mouse or other user input device. In some examples, a gesture may designate an item by defining a region of content having the item. For instance, a region of content defined by the gesture may be a region having an item that is substantially bounded by the gesture (e.g., a generally circular gesture), a region having an item that is touched or overlapped by the gesture, etc. In another example, a gesture may designate an item by selecting the item (e.g., a cursor or selector hovering over and/or selecting an item).

Additionally or alternatively, the gesture may include a motion of the user device itself. The motion of the user device may be detected by, for example, an accelerometer, an attitude sensor, a compass, etc. The motion of the user device may indicate an intent of the user to view content related to an item that is displayed by the user device, e.g., causing a search for information associated with a specific item.

In some embodiments, the user device may display a representation of the region of content defined by the gesture on the displayed content, to provide visual feedback to the user of the size and shape of the gesture. The representation of the region of content may comprise, for example, a line enclosing the region of content, a highlighting view of the region of content, and/or a magnifying lens view of the region of content. In some cases, the region of content having an item may include textual information, pictorial information, image information, audio information, and/or video information that is/are defined by the gesture.

In response to completion of the gesture, the user device may recognize tag-item data associated with the item of interest, and may cause a search for content related to the tagged item to be performed, for example, based upon the tag-item data. In some embodiments, context data and/or user data may be utilized to search for content related to the tagged item. For example, user data and/or context data may be referenced or identified to formulate, refine, or otherwise generate, alter, or enhance the search for related content.

The gesture-based tagging techniques described herein allow a user to view content related to an item presented within media content seamlessly by simply inputting a gesture that, for example, defines, designates, or indicates an item of interest within media content. In this regard, a user can view information associated with an item of interest without opening a web browser, navigating to a web page hosted by a search engine, and manually inputting a search query by, for example, typing or voice input, thereby improving a searching and/or media viewing experience of the user. Thus, the gesture-based tagging techniques described herein streamline and simplify the process of initiating the search for information while a user is viewing media content, thereby improving a user's productivity.

Embodiments of the invention described herein include a computer-implemented method of facilitating a view of content related to items within media content. The method includes under control of one or more processors configured with computer-executable instructions detecting a tagging gesture that indicates a user interest in an item presented within media content displayed to the user. The tagging gesture defines a region of displayed content having the item. In response to detecting the tagging gesture, an advertisement provided by a third party that is related to the item is presented.

In a second illustrative embodiment, one or more computer-readable media storing instructions that, when executed by a processor, configure the processor to perform acts. The acts include detecting a tagging gesture indicating an item presented within displayed media content. Tag-item data associated with the item indicated by the tagging gesture is identified. A search to be performed using the identified tag-item data and at least one of user data and context-item data is initiated. Content related to the item that is based on the tag-item data and the at least one of user data and context-item data is received. The related content is presented in association with the item.

In a third illustrative embodiment, a client device includes a processor, memory communicatively coupled to the processor, and a display screen configured to display media content to a user. The display screen displays an indication that another user associated with a remote user device has indicated an interest in an item presented within the same media content being displayed to the user. Such an indication is displayed as the media content is viewed by the user.

Multiple and varied implementations and embodiments are described below. The following section describes an example environment that is suitable for implementing gesture-based tagging. The following sections describe illustrative aspects of the gesture-based tagging techniques.

Exemplary Architecture

Various aspects of embodiments of the invention may be described in the general context of computer program products that include computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including dedicated servers, general-purpose computers, laptops, more specialty computing devices, and the like. The invention may also be practiced in distributed computing environments where tasks are performed by remote-processing devices that are linked through a communications network.

Computer-readable media include both volatile and nonvolatile media, removable and nonremovable media, and contemplate media readable by a database, a processor, and various other networked computing devices. By way of example, and not limitation, computer-readable media include media implemented in any method or technology for storing information. Examples of stored information include computer-executable instructions, data structures, program modules, and other data representations. Media examples include, but are not limited to RAM, ROM, EEPROM, flash memory and other memory technology, CD-ROM, digital versatile discs (DVD), holographic media and other optical disc storage, magnetic cassettes, magnetic tape, magnetic disk storage, and other magnetic storage devices. These technologies can store data momentarily, temporarily, or permanently.

An exemplary operating environment in which various aspects of the present invention may be implemented is described below in order to provide a general context for various aspects of the present invention. Referring initially to FIG. 1, an exemplary operating environment for implementing embodiments of the present invention is shown and designated generally as computing device 100. The computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The computing device 100 includes a bus 110 that directly or indirectly couples the following devices: a memory 112, one or more processors 114, one or more presentation components 116, input/output (I/O) ports 118, input/output components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," "tablet," etc., as all are contemplated within the scope of FIG. 1 and reference to "computing device."

The memory 112 includes computer-executable instructions (not shown) stored in volatile and/or nonvolatile memory. The memory may be removable, nonremovable, or a combination thereof. Exemplary hardware devices include solid-state memory, hard drives, optical-disc drives, etc. The memory 112 is an example of computer readable media. Computer-readable media includes at least two types of computer readable media, namely computer storage media and communications media.

Computer storage media includes volatile and non-volatile, removable and non-removable media implemented in any method or technology for storage of information such as computer readable instructions, data structures, program modules, or other data. Computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The computing device 100 includes one or more processors 114 coupled with a system bus 110 that read data from various entities such as the memory 112 or I/O components 120. In an embodiment, the one or more processors 114 execute the computer-executable instructions to perform various tasks and methods defined by the computer-executable instructions. The presentation component(s) 116 are coupled to the system bus 110 and present data indications to a user or other device. Exemplary presentation components 116 include a display device, speaker, printing component, and the like.

The I/O ports 118 allow computing device 100 to be logically coupled to other devices including the I/O components 120, some of which may be built in. Illustrative components include a microphone, joystick, game pad, satellite dish, scanner, printer, wireless device, keyboard, pen, voice input device, touch-input device, touch-screen device, interactive display device, or a mouse. The I/O components 120 can also include communication connections that can facilitate communicatively connecting the computing device 100 to remote devices such as, for example, other computing devices, servers, routers, and the like.

Figure 2:
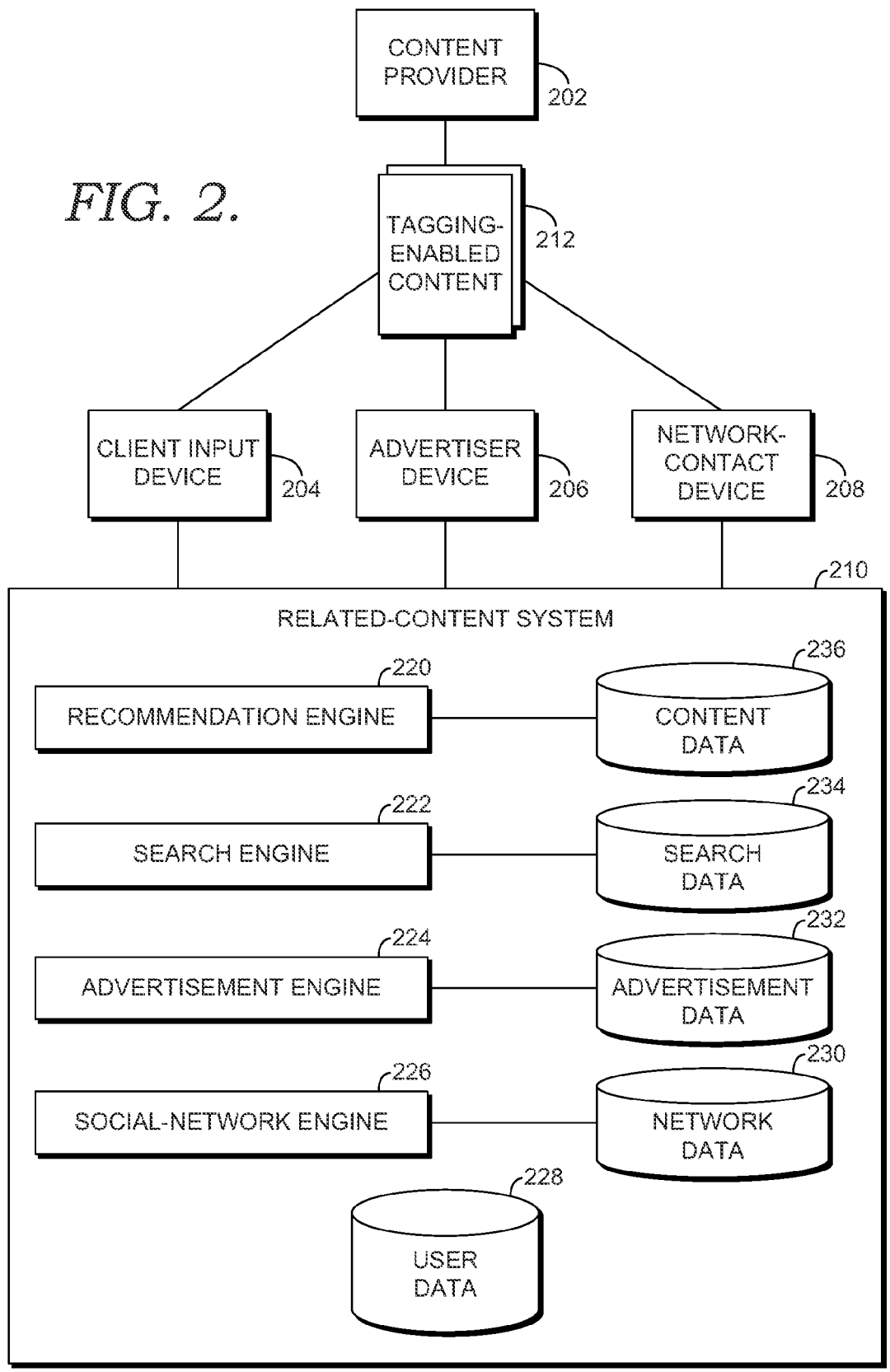
FIG. 2 is a schematic diagram of an exemplary environment including a user device usable to implement gesture-based tags.

FIG. 2 is a schematic diagram of an example environment 200 usable to facilitate viewing content related to items within media content. The environment 200 includes a content provider 202, a user device 204, an advertiser device 206, a network-contact device 208, and a related-content system 210. The content provider 202, the user device 204, the advertiser device 206, and the network-contact device 208 can communicate through a network or a combination of networks (not shown), which may include any number of networks such as, for example, a local area network (LAN), a wide area network (WAN), the Internet, a cellular network, a peer-to-peer (P2P) network, a mobile network, or a combination of networks.

The network environment 200 shown in FIG. 2 is an example of one suitable network environment and is not intended to suggest any limitation as to the scope of use or functionality of embodiments of the inventions disclosed throughout this document. Neither should the exemplary network environment 200 be interpreted as having any dependency or requirement related to any single component or combination of components illustrated therein. For example, one or more of the components may directly communicate with one another, for example, via HDMI (high-definition multimedia interface), DVI (digital visual interface), etc.

The content provider 202 can be any kind of computing device or devices capable of providing tagging-enabled content. For example, the content provider 202 can be a computing device such as computing device 100, as described above with reference to FIG. 1. In one embodiment, the content provider 202 is a media server or network of media servers that provides tagging-enabled content over a network, such as the Internet. In another embodiment, the content provider 202 provides tangible forms of tagging-enabled content, such as DVDs, Blu-ray Disk™, or other portable storage, etc.

The content provider 202 is configured to provide tagging-enabled content, such as tagging-enabled content 212. Tagging-enabled content, as used herein, refers to media content having at least one item presented within the content that is capable of being tagged. That is, tagging-enabled content is media content that includes at least one taggable item such that related content can be viewed. In this regard, tagging-enabled content includes at least one item within media content that, if selected (e.g., via a gesture), results in related content being displayed. As such, in some implementations, tagging-enabled content may include metadata indicating items for which related content may be viewed. Media content might be, for example, a television program, a movie, an on-demand program, a live program, a video clip, etc. A taggable item is an item presented within media content that can be tagged by a user. A tag provides an indication or designation that a particular item is of interest to a user. In this way, tagging an item enables content related thereto to be searched for and presented. An item can be any item or combination of items presented within media content. For example, with reference to FIG. 3, hat 310 can be one item, shirt 312 can be a second item, individual 314 can be a third item, necklace 316 can be a fourth item, etc.

As can be appreciated, any number of items within tagging-enabled content, such as a video, might be taggable. For instance, and with continued reference to FIG. 3, while hat 310, shirt 312, individual 314, and necklace 316 might be taggable items, individual 318, hat 320, and individual 322 might not be taggable items. That is, non-taggable items cannot be tagged by a user to indicate an interest of the item such that related content can be viewed. In some cases, each item within tagging-enabled content might be taggable. Alternatively, a portion of items within tagging-enabled content might be taggable. In embodiments, the items deemed or designated as taggable might be automatically selected or selected by, for example, an author, a director, a provider, or a composer of the media content; an advertiser; or the like.

Tagging-enabled content can be provided to, for example, user devices, such as user device 204, advertiser devices, such as advertiser device 206, network-contact device 208, such as network-contact device 208, and/or a related-content system, such as related-content system 210. The content provider 202 may provide tagging-enabled content 212 to such devices via a network (not shown). Such tagging-enabled content 212 may be downloaded, streamed, or otherwise provided by the content provider 202.

In some embodiments, the content provider 202 generates the tagging-enabled content 212. In other embodiments, another entity generates tagging-enabled content. In generating tagging-enabled content, items within media content might be identified and designated as taggable resulting in tagging-enabled content. In this regard, metadata associated with media content might include an indication of taggable items. In some embodiments, the metadata associated with tagging-enabled content might also indicate a set of one or more possible item actions that might be taken by a user in connection with a taggable item or a set of taggable items.

The user device 204 can be any kind of computing device capable of presenting tagging-enabled content and enabling a user to view content related to an item associated with the tagging-enabled content. For example, in an embodiment, the user device 204 can be a computing device such as computing device 100, as described above with reference to FIG. 1. The user device 204 may be implemented as any one of a variety of conventional computing devices such as, for example, a desktop computer, a notebook or laptop computer, a netbook, a tablet or slate computer, a surface computing device, an electronic book reader device, a workstation, a mobile device (e.g., Smartphone, personal digital assistant, in-car navigation device, etc.), a game console, a set top box, a television, or a combination thereof. As can be appreciated, the user device 204 is associated with a display screen such that tagging-enabled content and related content can be presented to the user. Such a display screen may be integrated with or remote from the user device 204.

The user device 204 is configured to facilitate presentation of media content, including tagging-enabled content. In this regard, the user device 204 presents tagging-enabled content such that a user can view the content.

In operation, the user device 204 plays or presents tagging-enabled content, such as tagging-enabled content 212. As such, tagging-enabled content is consumed by the user device 204. By way of example and not limitation, tagging-enabled content may be displayed on a display associated with the user device 204. Such a display might be integrated with or remote from the user device 204. The tagging-enabled content may be displayed within an application, such as a web browser, email client, or any other application on the user device 204. Additionally or alternatively, tagging-enabled content, such as a video and/or an audio, may be played by a media player of the user device 204. The tagging-enabled content may include text, an image(s), a picture(s), a visual representations of audio content, and/or video.

The user device 204 recognizes or identifies whether a tagging feature is enabled. A tagging feature allows a user to initiate tagging items within media content and/or viewing content related to tagged items (e.g., items tagged via a user, an advertiser, a network contact, etc.). In this regard, a tagging feature allows a user to view content related to an item tagged by the user or a third-party. In one embodiment, the user device 204 recognizes whether a user-tagging feature and/or a third-party tagging feature is enabled. A user-tagging feature allows a user to initiate item tagging to view content related to the tagged items. A third-party tagging feature allows a user to view content related to items tagged by a third-party, such as an advertiser or network contact.

A tagging feature can be enabled, for example, via a user selection. In such an embodiment, a user can select to enable the user-tagging feature and/or the third-party tagging feature. Such tagging features can be enabled, for example, prior to or during presentation of media content (e.g., tagging-enabled content). For instance, prior to or during presentation of media content, a user may select to enable viewing content related to items tagged by a user and/or a third-party associated with or related to the user.

As can be appreciated, a user may select to enable one or both tagging features each instance of viewing a media content, in association with configuring a setting(s) for the user device, or as desired by the user. In other cases, a user device might be configured with a default setting that enables or disables one or both tagging features (i.e., user-tagging feature and third-party tagging feature).

When the user-tagging feature is enabled, the user device 204 enables a user to initiate tagging items and/or viewing content related to such items. Accordingly, when the user-tagging feature is enabled, the user device 204 can detect tagging gestures. A tagging gesture refers to an indication provided by a user to tag a taggable item that is of interest to the user. A taggable item is an item presented within tagging-enabled content that can be tagged. In some cases, a taggable item is an item displayed on the display that can be tagged. For example, an album title thumbnail, a movie poster thumbnail, etc. might, in some cases, be taggable regardless of whether presented within media content. In either case, a taggable item is an item for which related content can be identified and presented. As can be appreciated, in some embodiments, taggable items can be recognized, for example, visually or audibly, by a user. For instance, items that can be tagged within media content may be highlighted, outlined, or otherwise visually identified such that a user viewing media content can readily recognize an item that can be tagged.

A user can provide a tagging gesture directed to an item. That is, a user can provide a tagging gesture to select, designate, or otherwise indicate an item of interest of the user. Accordingly, the user device 204 may be configured to detect tagging gestures input to the user device 204 or a component associated therewith. In some examples, a single tagging gesture may select an item and/or define an item (e.g., by defining a region of content having an item), and causes content related to the specified item to be obtained. For example, the user device 204 may consume content such as playing a video. The tagging gesture may include a touch input from one or more fingers of the user or a pointing device such as a stylus or digital pen. The user device 204 may detect the touch input from the user through a touch screen, a touch pad, or another input/output interface of the user device 204. In another embodiment, the tagging gesture may include an eye movement of the user. The user device 204 may detect the eye movement through an image capture device of the user device 204.

In yet another embodiment, the tagging gesture may include a motion of a body or a part of the body of the user such as a finger, a hand, head, and/or an arm. The user device 204 may detect the body motion through a camera, other image capture device or any motion detection component of the user device 204. For example, the user device may be a gaming device with a camera or other motion detection interface such as an Xbox® gaming console configured with a Kinect™ motion detection system, both available from Microsoft Corporation of Redmond Wash. The user device may receive and interpret images or signals the user device received to determine what motion the user is performing. The motion of the user may trigger the search for related content and/or define a scope of the search for related content. Additionally or alternatively, the scope of the search for related content may be determined with reference to a context in which the item is being displayed, data associated with the user, or the like, as described more fully below.

In some embodiments, the tagging gesture may include a motion or selection of a remote controller (e.g., pointer, joystick, game controller, or the like) controlled by the user. The user device 204 may detect the motion of the remote controller controlled by the user through a detector in proximity to the remote controller, which transmits information of the motion of the remote controller to the user device 204.

In other embodiments, the tagging gesture may include a motion or selection of a cursor controlled by a mouse, track ball, or other input device coupled to an input/output interface of the user device 204. In that case, the user device 204 may detect the motion of the cursor controlled by the input device. A cursor or selector refers to a moveable symbol that indicates a position on a display screen. Movement or selection of a cursor or selector within a display screen can be controlled, for example, by a mouse, track ball, etc. connected to a computing device.

The user device 204 may also include voice recognition usable to recognize voice commands and/or inputs, and translate the voice commands and inputs into textual inputs. The user device 204 may then use these textual inputs to formulate or refine a search query or data (e.g., tag-item data). In an event that the user device 204 may be used by more than one user, the present user may be recognized and historical information (e.g., within a predefined period of time such as within one hour) related to the present user may be retrieved for formulating or refining the query or data.

The user device 204 may further include gesture learning to allow the user to define one or more gestures. For example, the user device 204 may allow the user to define custom gestures for initiating various actions, such as buying an item, searching for information related to an item, searching for media content related to an item, saving a tagged item, etc. The user device 204 may gather information for each of these user-defined gestures, such as curvature, gesture speed, or the like, to differentiate the user-defined gestures from one another.

Although separate tagging gestures are described in the foregoing embodiments, a tagging gesture may include a combination of one or more tagging gestures as described above.

The user device 204 may further include gesture tracing which enables displaying a line or other representation of a tagging gesture on a display associated with the user device 204 in response to entry of the tagging gesture by the user. The representation of the tagging gesture may be displayed in accordance with the position of selector or motion of the tagging gesture. The representation provides feedback to the user, indicating the size, shape, and/or position of the gesture that he/she just entered. The representation may include, but is not limited to, a line enclosing the item, a highlighting view of the item, a line tracing path of a selector, an indication of a position of a selector, and/or a magnifying lens view of the item.

Upon detecting a tagging gesture associated with a taggable item within media content or an item displayed on the display, the user device 204 is configured to identify and tag an appropriate item as indicated by a user. In this regard, upon detecting an indication or gesture to tag an item, the designated item is identified or recognized. A tagged item can be identified using an item identifier that uniquely identifies or indicates an item in any manner. For example, an item identifier might be a name, a subject matter, a value, a description, or other indicator of the item.

In one embodiment, to identify or recognize an item, metadata associated with tagging-enabled content might be utilized. For example, the metadata may indicate an item(s) associated with a particular frame, position, or time within the media content. In this regard, at a time of 1 hour, 5 minutes, and 32 seconds into the tagging-enabled content, the metadata may indicate that a "hat" is a taggable item within the media content. Accordingly, the user device 204, or a portion thereof, can detect or identify at what point in media content or at what position within the displayed content a selected item of interest exists. As can be appreciated, such metadata might be integrated with the tagging-enabled content or separate from the tagging-enabled content.

Alternatively or additionally, an item might be recognized by recognizing the item, for example, by the user device or another device (e.g., a remote server). For example, the user device 204 may itself recognize an item based on an image of the item. As such, the user device 204 may include an image recognition module (not shown) which may identify one or more items in the part of the content that is defined by the region of content or the tagging gesture.

In another example, the user device 204 may further submit an image of an item, or an indication thereof, as a query to a given website, application, or service that detects and/or provides information of items. For instance, the user device 204 may include an image extraction module (not shown) which may extract the part of the image that is defined by the tagging gesture from the image and submit the extracted part of the image to a search service for an image search.

Upon recognizing or identifying an item of interest, such as an item selected via a gesture, the designated item is tagged. Accordingly, the user device 204 can recognize or designate a taggable item as an item of interest to a user. A tagged item enables a user to view content related to the tagged item. In this regard, upon an item being tagged, content related to the item can be viewed by the user that initiated the item tag or by a third-party. Tagging an item can be performed in any manner that provides an indication that a particular item is of interest to a user. For example, an item identifier can be included in a tagged item list, an item identifier can be associated with a tag, or an item identifier can be otherwise indicated as tagged or an item of interest. The tagged item, or an indication thereof, can be saved, for example, in association with a user device, a user, a media content identifier, etc. Accordingly, an item identifier of a tagged item (e.g., tagged-item data) can be saved, for instance, in connection with the user device, the related-content system, or the like. In this regard, an item identifier that identifies the specific item tagged can be saved.

In addition to identifying an item of interest (e.g., an item identifier used to tag the item), other tag-item data can be recognized or identified by the user device 204. Tag-item data refers to any data associated with an item that describes, indicates, or identifies the item. Accordingly, tag-item data might be, for example, an item identifier, a description of the item, a detail of the item, a summary of the item, a representation of the item, a time or location at which the item appears in the media content, a title identifier or author identifier of the media content, a time or position at which the item is tagged, an image associated with the item, etc. In this regard, the user device 204 may perform content analysis to analyze the item selected by the user to identify any tag-item data associated with the item, metadata analysis to analyze or review the metadata associated with the media content to identify any tag-item data associated with the item, gesture analysis to analyze the gesture to identify any tag-item data associated with the item (e.g., position or time of tagging gesture), or the like.

In some embodiments, the user device 204 may reference or identify item-context data. That is, the user device 204 may access, determine, identify, or recognize item-context data. Item-context data or context data refers to any data or information that describes or indicates the context of an item (e.g., a tagged item). In this regard, the user device 204 may analyze context information providing signals as to the context in which the item, for example, is presented. By way of example and not limitation, context information may include content proximate to the item, a title of a media object being presented, metadata associated with the displayed content (e.g., other items within the same frame as the tagged item, other items within other frames within the media content, metadata associated with other portions of the media content, audio associated with the item, etc). Item-context data may be used to improve relevance of related content presented by formulating a more relevant query based at least in part on the context information.

The user device 204 may perform content analysis to analyze the context of the item selected by the user to identify any item-context data associated with the item, metadata analysis to analyze or review the metadata associated with the media content to identify any item-context data associated with the item, gesture analysis to analyze the gesture to identify any item-context data associated with the item (e.g., position or time of tagging gesture). By way of example only, assume that a user initiates tagging of a "hat" item. Further assume that the actor within the media content that is wearing the "hat" is also wearing a shirt and shoes. In some cases, the user device 204 may analyze the scene or frame and recognize that the actor wearing the hat is also wearing a shirt and shoes having the same brand as the hat. In other cases, the user device 204 may review the metadata associated with the scene or frame in which the actor is wearing the tagged "hat" and, in accordance with the metadata, recognize that the hat, shirt, and shoes are the same brand.

Additionally or alternatively, the user device 204 may reference or identify user data. That is, the user device 204 may access, determine, identify, or recognize user data. User data refers to any data or information pertaining to or associated with the user. User data may include, but is not limited to, a user identifier, a location of the user device 204 such as GPS data, one or more historical tags, actions, and/or sessions of the user (e.g., previously tagged items or media content with tagged items), actions initiated by the user, parameters or attributes of the user device (e.g., whether it is a mobile device, a type of mobile device, a capability(s) of the device, or the like), a home geographic location associated with the device, user demographics, user preferences, etc. The user data may further include social data gathered from social networks, contacts, telephone logs, text message logs, affiliations and memberships of the user, and the like. The user data may also include documents, files, images, photos, emails, or any other content or data stored on the user device.

The user device 204 may incorporate user data to formulate or refine a search query or transmitted data and, thereby, improve relevance of the related content. In some cases, before any personal information is used to formulate a search query, the user may be prompted whether he/she desires to share this information and given the option to always share this information, never share this information, or to be prompted each time before sharing the information.

By way of example and not limitation, the user device 204 may determine that based on recent items tagged, the user is interested in apparel associated with the R & B genre and may, thereby, infer that the user would prefer to view related content of the instant tagging that is related to the R & B genre. By way of another example, in the case that a user device is within a specific geographical region, it may be inferred that the user is likely interested in related content of the instant tagging that is associated with the geographical region of the user device (e.g., local music store).

Upon identifying data associated with the tagged item, such as tagged-item data, context-item data, and/or user data, such data can be communicated to the related-content system 210 (e.g., in the form of a query). As described more fully below, the related-content system 210 can utilize such data to identify and provide content related to an item(s) for display to the user. In this regard, the related-content system 210 can use tagged-item data, context-item data, and/or user data to identify and provide content related to an instant tagged item.

While various embodiments described herein describe that the user device 204 can initiate a remote search (e.g., Internet search) via the related-content system 210 in response to receiving a tagging gesture, the present disclosure is not limited to remote searches. In one embodiment, the user device 204 may additionally or alternatively initiate a local search in response to receiving a tagging gesture that defines a region of content or an item. In other embodiments, the local search may include a search within local memory of the entire user device 204 or a designated memory or folder of the user device 204.

When the user device 204 receives content related to a tagged item(s) (e.g., related-content data from the related-content system 210), the related-content data can be presented via the user device 204 to the user along with the tagging-enabled content being presented to the user. Related-content data or related content, as used herein, refers to any information related to the tagged item. Related-content data might be, for example, information describing or detailing the item, advertisements associated with the item, suggestions related to the item, or the like. In one embodiment, related-content data overlays the tagging-enabled content such that the related-content data appears integrated with the media content. In another embodiment, the tagging-enabled content can be modified to integrate the related-content data with the media content.

As can be appreciated, the related-content data can be displayed in any position relative to the tagged item. In one embodiment, the related-content data is displayed adjacent to, over, or near the tagged item. In another embodiment, the related-content data is displayed at a particular position on the display screen, such as the lower-right corner, etc. In yet another embodiment, the related-content data is displayed at an optimal position based on the media content. Accordingly, in some cases, the user device may determine a location at which to display the related-content data and/or the item actions.

In some embodiments, one or more item actions can be presented in association with the related-content data. In this regard, an item action(s) might be presented simultaneously with related-content data. Alternatively, an item action might be presented upon presentation of the related-content data. For example, assume that content related to an item is initially presented in conjunction with an item within media content. Now assume that a user selects the item or the related-content data. In such a case, an item action(s) may now be presented.

An item action refers to an indication of any action that can be taken in connection with the item. Item actions include, but are not limited to, saving the tagged item for viewing or purchasing later, purchasing the tagged item, viewing more information about the tagged item, emailing the tagged item, posting the tagged item, listening to an audio (e.g., advertisement or information) about the tagged item, sharing an item, etc.

Specific item actions to be displayed in association with the related-content data might be based on default item actions that are presented. In this regard, a specific set of one or more item actions can be presented in association with an item despite the specific item tagged. In another embodiment, item actions to be displayed might be determined via metadata of the tagging-enabled content that indicates available actions for the tagged item. In such an embodiment, the user device 204 might identify the action(s) to display based on the metadata for the tagging-enabled content. For instance, the metadata associated with a specific item or set of items may specify possible item actions that a user may take. In yet other embodiments, the item actions to display might be determined or identified by the related-content system or other computing device or might be based on a user preference of user history.

In embodiments that an item action is presented in association with the related-content data, the user device 204 may identify, recognize, or determine an action a user intends to initiate. Such an action indication can be input by a user using any method, such as the methods described above for gesture tagging. For example, a user may perform a gesture to select or otherwise indicate a specific action to initiate. In accordance with a selection of an item action, the user device can initiate the action. For example, assume that a user selects a "buy" item action. In such a case, the user device can facilitate purchase of the item (e.g., linking to a website that sells the item).

As can be appreciated, in some embodiments, the tagging-enabled content being presented to a user might be paused in connection with tagging an item and/or viewing related content. Pausing tagging-enabled content may occur based on a user indication to pause the tagging-enabled content so that the user tag an item and/or view related content. In other cases, tagging-enabled content is automatically paused, for example, upon detecting initiation of a tagging gesture.

The related-content system 210 of FIG. 2 is configured to identify or determine content related to an item for presentation in association with the item. Related content or related-content data might be any content or data, such as advertisements, information describing the item, information identifying the item, product information, suggestions related to the item, third-party tagging information, etc. The related-content system 210 might employ any number of computing devices, services, or engines to identify related-content. FIG. 2 illustrates usage of a recommendation engine 220, a search engine 222, an advertisement engine 224, and a social-network engine 226. Each such engine, according to embodiments, can be implemented as server systems, program modules, virtual machines, components of a server or servers, networks, and the like. For clarity of explanation, we will describe embodiments in which the recommendation engine, search engine, advertising engine, and social network engine are separate, while understanding that this may not be the case in various configurations contemplated within the scope of the present invention.

In accordance with the user-tagging feature, the user device 204 communicates with the related-content system 210, or a portion(s) thereof, to facilitate a search for related-content data in response to a tagging gesture. The recommendation engine 220, the search engine 222, and the advertisement engine 224 function to receive or reference tag-item data, user data, and/or context-item data and utilize such data to identify and provide content related to a tagged item. In one embodiment, tag-item data, user data, and/or context-item data can be received from a user device, such as user device 204. For example, tag-item data, user data, and/or context-item data can be received in the form of a search query to initiate a search for content related to a tagged item. In another embodiment, tag-item data, user data, and/or context-item data can be referenced from another source. By way of example, in some cases, a portion of tag-item data, such as an item identifier, and a portion of user data, such as user device location, may be communicated from the user device 204. Additional tag-item data, context-item data, and/or user data can be referenced. For instance, historical tagging data associated with the user identifier might be stored and accessed by the related-content system 210, or a portion thereof. Further, the item identifier may be used to reference additional information associated with the tagged item.

In some cases, user data can be referenced from user data store 228. For example, in some cases, user data is previously sent from a user device and captured within the user data store 228. In such a case, the user data can be referenced and utilized to identify related content. As can be appreciated, user data can be referenced from user data store 228 even though user data might be communicated from the user device 204 in association with an item being tagged. For example, upon tagging an item, some user data may be communicated from the user device, such as the device location, and other user data, such as user tagging history, can be referenced from the user data store 228. Similarly, although not illustrated, tag-item data and/or context-item data can be referenced from a data store associated with the related-content system 210 that contains data associated with media context.

As described, the recommendation engine 220, search engine 222, and/or advertisement engine 224 can use tag-item data, user data, and/or item-context data (e.g., in the form of a query) to provide more relevant related-content. For example, based on location of a user device, an advertisement specific for a local store may be provided to complete an action of buying or viewing. By way of further example, the parameters of the device being used may be recognized and used to select and send related-content data in a most appropriate format (e.g., HD quality advertisements, HDTV, mobile device, etc.).

In some embodiments, the related-content system 210, or a portion thereof receives an indication of a tagged item (e.g., an item identifier) and/or other data (e.g., tag-item data, item-context data, and/or user data). Such data can be stored via the related-content system 210 for subsequent use. For example, such data might be stored in the user data store 228 for later use by the user and/or network data store 230 for use by a third party, as described more fully below. Further, in some embodiments, the related content transmitted to the user device 204 for presentation can also be stored within the related-content system 210. For instance, such related content, or an indication thereof, might be stored in the user data store 228 for later use by the user and/or network data store 230 for use by a third party.

The recommendation engine 220 provides related-content that is recommended or suggested to the user based on the tagged item. Accordingly, the recommendation engine 220 can recommend or suggest, for example, similar media content, products, or services based on item-based data, item-context data, user data, etc. In one embodiment, the recommendation engine 220 utilizes tag-item data, item-context data, and/or user data (e.g., in the form of a query) received from the user device 204 to identify or determine recommended or suggested content that is related to a tagged item. Alternatively or additionally, the recommendation engine 220 uses data received from the user device 204 (e.g., in the form of a query) to identify or recognize additional data (e.g., tag-item data, item-context data, and/or user data). For example, the recommendation engine 220 might receive an item identifier and a user identifier and, thereafter, use the identifiers to reference or lookup other tag-item data and user data, respectively. The data referenced by the recommendation engine 220 can then be used to identify recommended or suggested content related to the tagged item.

By way of example only, the recommendation engine 220 might utilize a time at which the user is viewing the tagging-enabled content, a type of device being used to view the tagging-enabled content, and/or a location of the device at the time the user is viewing the tagging-enabled content to identify recommendations related to a tagged item. Based on the time and location of viewing the tagging-enabled content associated with a tagged item, the recommendation engine 220 can suggest or recommend another media content, such as a movie, that might be of interest to the user. In this regard, the suggested media content might be a specific movie that is playing at a local movie theater at a specific time.

As can be appreciated, the recommendation engine 220 might reference a data store, such as content data store 236, to identify, reference, or lookup suggested or recommended content. Accordingly, the recommendation engine 220 can utilize tag-item data, item-context data, and/or user data (e.g., received in the form of a query) in association with the content data store 236 to identify recommended or suggested content (e.g., media content and related data) for the user of the user device 204.

The search engine 222 provides data or information that is related to a tagged item. In this regard, the search engine 222 can provide any details associated with a tagged item based on item-based data, item-context data, user data, etc. In one embodiment, the search engine 222 utilizes tag-item data, item-context data, and/or user data (e.g., in the form of a query) received from the user device 204 to identify or determine content that is relevant to a tagged item. Alternatively or additionally, the search engine 222 uses data received from the user device 204 (e.g., in the form of a query) to identify or recognize additional data (e.g., tag-item data, item-context data, and/or user data). For example, the search engine 222 might receive an item identifier and a user identifier and, thereafter, use the identifiers to reference or lookup other tag-item data and user data, respectively. The data referenced by the search engine 222 can then be used to identify content relevant to the tagged item.

By way of example only, the search engine 222 might utilize an identification of an instant tagged item along with items historically tagged by the user to identify content relevant to the instant tagged item. Based on the item presently tagged and the items previously tagged by the user, the search engine 222 can identify search results or information contained therein that is relevant to the instant tagged item. In this regard, the related-content data identified by the search engine 222 might be a brand of the tagged item, a URL to a website containing information about the tagged item, a location or store at which the tagged item can be located, a price of the tagged item, a description of the tagged item, a detail of the tagged item, an image of the tagged item, an audio associated with the tagged item, or the like.

As can be appreciated, the search engine 222 might reference a data store, such as search data store 234, to identify, reference, or lookup relevant content. Accordingly, the search engine 222 can utilize tag-item data, item-context data, and/or user data (e.g., receive in the form of a query) in association with the search data store 234 to identify relevant content (e.g., search results or portions thereof) for the user of the user device 204. As can be appreciated, the search engine 222 may take the form of an Internet search engine. For instance, a commonly known commercial engine is the BING search engine provided by Microsoft Corporation of Redmond, Wash.

The advertisement engine 224 provides related-content data in the form of an advertisement. In this regard, the advertisement engine 224 can provide any information associated with an advertisement that promotes a product or a service. An advertisement includes, for example, an indication of an entity that provides a product and/or service; a coupon, deal, or incentive that promotes a product and/or service; and the like. As can be appreciated, an advertisement can be submitted by a third-party, such as an advertising entity. Accordingly, the advertisement engine 224 can provide any details associated with an advertisement corresponding with a tagged item. In one embodiment, the search engine 222 utilizes tag-item data, item-context data, and/or user data (e.g., in the form of a query) received from the user device 204 to identify or determine advertisement content that is associated with a tagged item. Alternatively or additionally, the advertisement engine 224 uses data received from the user device 204 (e.g., in the form of a query) to identify or recognize additional data (e.g., tag-item data, item-context data, and/or user data). For example, the advertisement engine 224 might receive an item identifier and a user identifier and, thereafter, use the identifiers to reference or lookup other tag-item data and user data, respectively. The data referenced by the advertisement engine 224 can then be used to identify content relevant to the tagged item.

By way of example only, the advertisement engine 224 might utilize an identification of an instant tagged item along with items historically tagged by the user to identify an advertisement relevant to the instant tagged item. Based on the item presently tagged and the items previously tagged by the user, the advertisement engine 224 can identify an advertisement(s) that is relevant to the instant tagged item. In this regard, the advertisement identified by the advertisement engine 224 might be an indication of a store at which the item can be purchased, a promotion of the item, a coupon for the item, or the like.

As can be appreciated, the advertisement engine 224 might reference a data store, such as advertisement data store 232, to identify, reference, or lookup relevant advertisements. Accordingly, the advertisement engine 224 can utilize tag-item data, item-context data, and/or user data (e.g., received in the form of a query) in association with the advertisement data store 232 to identify relevant content (e.g., search results or portions thereof) for the user of the user device 204.

As can be appreciated, any number of engines can be utilized to search for related content. For example, the user device 204 can send a query and/or data to any engine or combination of engines (e.g., the recommendation engine 220, the search engine 222, the advertisement engine 224, etc.). In some cases, the user device 204 can determine the engine or set of engines from which to request related content. In other cases, the related-content system can determine the engine or set of engines from which to request related content. Such a determination can be made, for example, based on the item or type of item or metadata associated therewith.

Turning to the third-party tagging feature, as discussed above, a third-party tagging feature may be applied to the user device 204. Enablement of such a feature may be indicated by a user of the user device 204 or automatically applied (e.g., a default setting). Implementation of a third-party tagging feature allows a user to recognize items tagged by a third-party (i.e., an individual or entity different from the user). Generally, a third-party uses a device separate from the user device to tag items. In some cases, the third party is an advertiser. In other cases, the third party is a network contact. A network contact refers to an individual that is a contact of the user's via a network or contact service. For example, a contact might be connected with a user via an application, such as email, address book, instant messaging, social network, etc. In some embodiments, a user can indicate a specific third-party(s) of which the user is interested. For instance, the user may indicate that he or she would like to view tagged items from advertisers, from network contacts, from a particular advertiser(s), from a particular network contact(s), from any advertiser or network contact(s), etc.

In implementation, a third party can initiate tagging items within media content via a computing device. In this regard, tagging-enabled content, such as tagging-enabled content 212, is provided to a computing device associated with the third party. For instance, the content provider 202 can provide tagging-enabled content 212 to the advertiser device 206 and/or the network-contact device 208 such that the corresponding third-party can tag items within the tagging-enabled content. By way of example, an advertiser initiates tagging items within tagging-enabled content via advertiser device 206, and a network-contact initiates tagging items within tagging-enabled content via network-contact device 208. A third party can tag items in any manner, such as, for example, as described more fully above in relation to the tagging gestures provided by a user of the user device 204. In another example, a third party may provide tagged items or indicate a preference to tag particular items without using the tagging-enabled content. For instance, an advertiser may provide an indication to tag any "hats" in a particular media content, tag any "hats" in any media content, etc.

Upon a third party initiating a tag for an item, the item is tagged to indicate a specific interest in the item. In one embodiment, tag-item data associated with the tagged item is identified and provided to the related-content system 210. In another embodiment, the tagged item, or an indication thereof, is provided to the related-content system 210 and, thereafter, used to identify tag-item data associated with the item. Similarly, item-context data associated with the item tagged by the third party and/or third-party data can be identified (e.g., at the third-party device or the related-content system 210). Third-party data refers to any data corresponding with the third-party. Third-party data may be, for example, a third-party identifier; a location of the third-party device such as GPS data; one or more historical actions and/or sessions of the third-party (e.g., previously tagged items or media content with tagged items); parameters or attributes of the third-party device (e.g., whether it is a mobile device, a type of mobile device, a capability(s) of the device, or the like); a home geographic location associated with the device; third-party demographics; third-party preferences; social data gathered from social networks, contacts, telephone logs, text message logs, affiliations and memberships of the third-party; documents, files, images, photos, emails, or any other content or data stored on the third-party device; an action(s) taken by the third-party; a time or location of the item tagging; a third-party rating of the tagged item; any related content provided to the third party; etc. Tag-item data, item-context data, and/or third-party data can be identified as discussed more fully above in relation to the user device.

An indication of a tagged item and/or tag-item data, third-party data, and item-context data can be communicated to the related-content system 210 and stored in association therewith. For example, tag-item data including an indication of a tagged item(s) associated with network contacts might be stored in network data store 230, and tag-item data including an indication of a tagged item(s) associated with advertisers might be stored in advertisement data store 232. Such data can be stored in association with an indication of the third-party that tagged the specific item. In some cases, all data associated with an item gathered by the third-party device might be saved. In other cases, a portion of the data associated with an item that is gathered by a third-party device might be saved. For instance, the related-content system 210 might simply save an indication of the tagged item. In other instances, the related-content system 210 might save an indication of the tagged item, third-party data, or the like.

Referring again to the user device 204, an indication of the media content to view or being viewed can be communicated to the related-content system 210. For example, when the user indicates enablement of the third-party tagging feature and/or selects media content to view, an indication of the media content can be transmitted. In such a case, the related-content system 210 can identify whether any corresponding third-party of interest to the user is associated with any tagged items within the media content being viewed by the user at the user device 204. For example, assume the user of the user device desires to view items tagged by network contacts. In such a case, the social-network engine 226 can identify whether any network contacts (or specific network contact(s)) are associated with any tagged items within the media content being viewed by the user. In this regard, the social-network engine 226 might access network data store 230 to identify any items tagged by a network contact. Similarly, assume the user of the user device desires to view items tagged by advertisers. In such a case, the advertisement engine 224 can identify whether any advertisers have tagged any items within the media content being viewed by the user. In this regard, the advertisement engine 224 might access advertisement data store 232 to identify any items tagged by an advertiser.

Upon identifying that at least one item has been tagged by a third-party of interest, the related-content system 210 can provide appropriate information to the user device 204. In this regard, the related-content system 210 can provide related content to the user device 204. Such related-content data can be any data corresponding with the item tagged by the third party. For example, related-content data might be an indication of the tagged item, a time of the tagged item, an action taken by the third-party in relation to the tagged item, a recommendation, a search result, an advertisement, an indication of the third party that tagged the item, etc. In one embodiment, the content related to the tagged item that is provided to the user device 204 might be the same content as that presented to the third-party. For example, assume a network contact tags an item in a first media content via network-contact device 208 and, in response, views an advertisement related to the tagged item. In such a case, the related content (e.g., an advertisement or an indication of the advertisement) can be saved such that when the user of the user device 204 indicates a desire to view items tagged by a third party(s), the same advertisement is provided to the user device 204 to be viewed by the user in association with the item tagged by the third party.

In another embodiment, the content related to the tagged item that is provided to the user device 204 might be independent of the content presented to the third-party. By way of example, assume a network contact tags an item in a first media content via network-contact device 208 and, in response, views an advertisement related to the tagged item. Now assume that the user of the user device 204 would like to view items tagged by a third party(s). In such a case, an advertisement or other data presented to the user via the user device 204 that is associated with the item tagged by the third party might be different from the advertisement presented to the third party. The advertisement presented to user of user device 204 may be more pertinent or relevant to the user of the user device 204. In this regard, the related-content system 210 may utilize user data associated with the user of the user device 204 to identify related content (e.g., via the recommendation engine, search engine, advertisement engine, etc.) that is more specific to the user while the advertisement presented to the third party might have been based on the user data of the third-party (e.g., location of the third-party device, type of the third-party device, etc.).

Accordingly, in such an embodiment, in addition to communicating an intent or request to view third-party tags, user data or other data may also be communicated from the user device 204 to the related-content system 210. Alternatively, the related-content system 210 might reference such data (e.g., user data from the user data store 228).

The third-party tagging data provided to the user device 204 can be any data. For instance, an indication of the item tagged by a third-party (e.g., item identifier) can be provided to the user device 204. In this case, a "hat" item might be visually identified in the media content playing via the user device 204 such that the user can select the "hat" and perhaps view a notice that a "network contact" tagged this item. In another example, upon selecting the visually identified "hat," related content might be presented to the user, such related content might be the same as that displayed to the third party or more relevant to the user of the user device 204 (e.g., utilizing user data of the user, such as location of the device, tagging history of the device, etc.).

In another example, an indication of a number of friends or the specific friend(s) that tagged an item might be displayed. In yet another example, an action performed by a third party in relation to the item can be presented (e.g., "Adam purchased this item" or "Adam posted this hat to Facebook® at 12:15 p.m. on Sep. 22, 2011."). These examples are not intended to limit the scope of this invention and inventors realize that any number of data can be presented to the user.

Accordingly, upon the user device 204 receiving such related-content data, the user device 204 can display the appropriate information in connection with the media content being viewed. Such information can be overlaid onto the media content or integrated with the media content. The information can be presented in any position on the display screen. For instance, the information might be presented in a default location, a determined location, near or adjacent to the item tagged by a third-party, or the like.

As can be appreciated, items tagged by third parties can be realized by the user of the user device 204 in real-time. In this way, as the related-content system 210 recognizes that the user device 204 is viewing a particular media content and upon receiving an indication of an item of the same media content being tagged in association with a third-party, an indication of the third-party initiated tag can be immediately provided to the user device 204.

In an alternative implementation, upon receiving an indication of a tag by a third party, the related-content system 210 can provide the appropriate data to the user device 204 without assessing whether the tagged item is applicable to the user device 204. In such an implementation, the user device 204 can receive the related-content data (e.g., an indication of the tagged item) and store the data and/or identify if such data is presently applicable to currently playing media content.

Example Use Scenario

FIGS. 3-9 illustrate an exemplary possible scenario using gesture-based tagging of an item to view related content. The use scenarios are described with reference to the example environment 200 of FIG. 2 for convenience. However, the use scenarios are not limited to use with the example environment 200 of FIG. 2.

Figure 3:
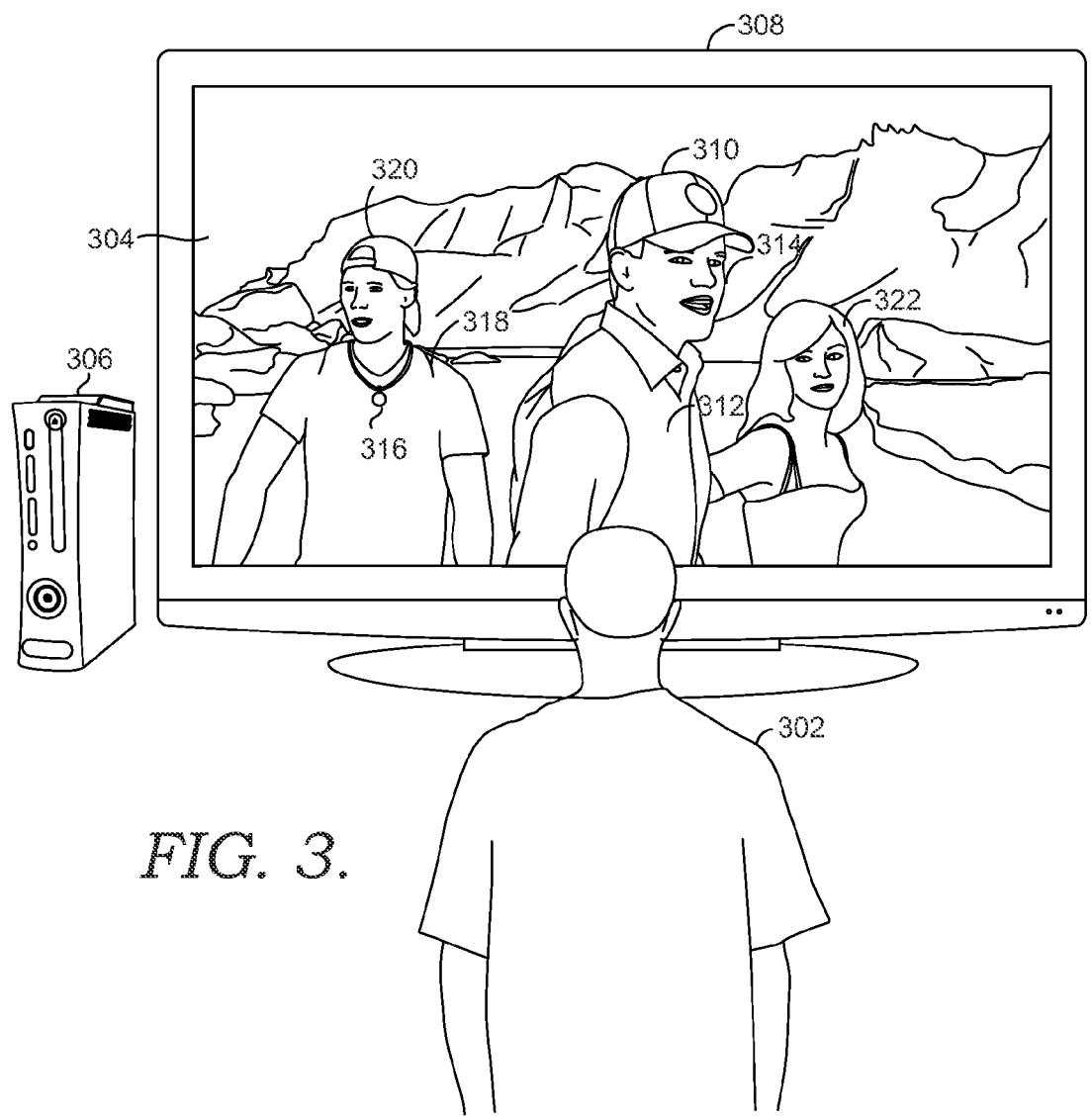
FIG. 3 is a schematic diagram of example content presented on a display of a user device.

FIG. 3 illustrates an example in which the user 302 is viewing tagging-enabled content 304 via a client device 306 associated with a display screen 308. The presented content may include text, an image, a representation of audio content and/or video. In some embodiments, the media content might be displayed via a web-enabled application, such as a web browser, an email application, a news application, or the like. In other embodiments, the application may be an application that is not web enabled. The gesture-based tagging techniques described herein are applicable to any application that displays or otherwise presents content to a user.

Previously, if the user 302 were interested in learning more about content being displayed, the user would have had to exit or minimize the content they were currently viewing and open a web browser to perform a search or utilize another computing device to perform a search. The gesture-based tagging techniques described herein allow a user to initiate a tag of an item such that the user or a third-party can view information related to the tagged item.

Figure 4:
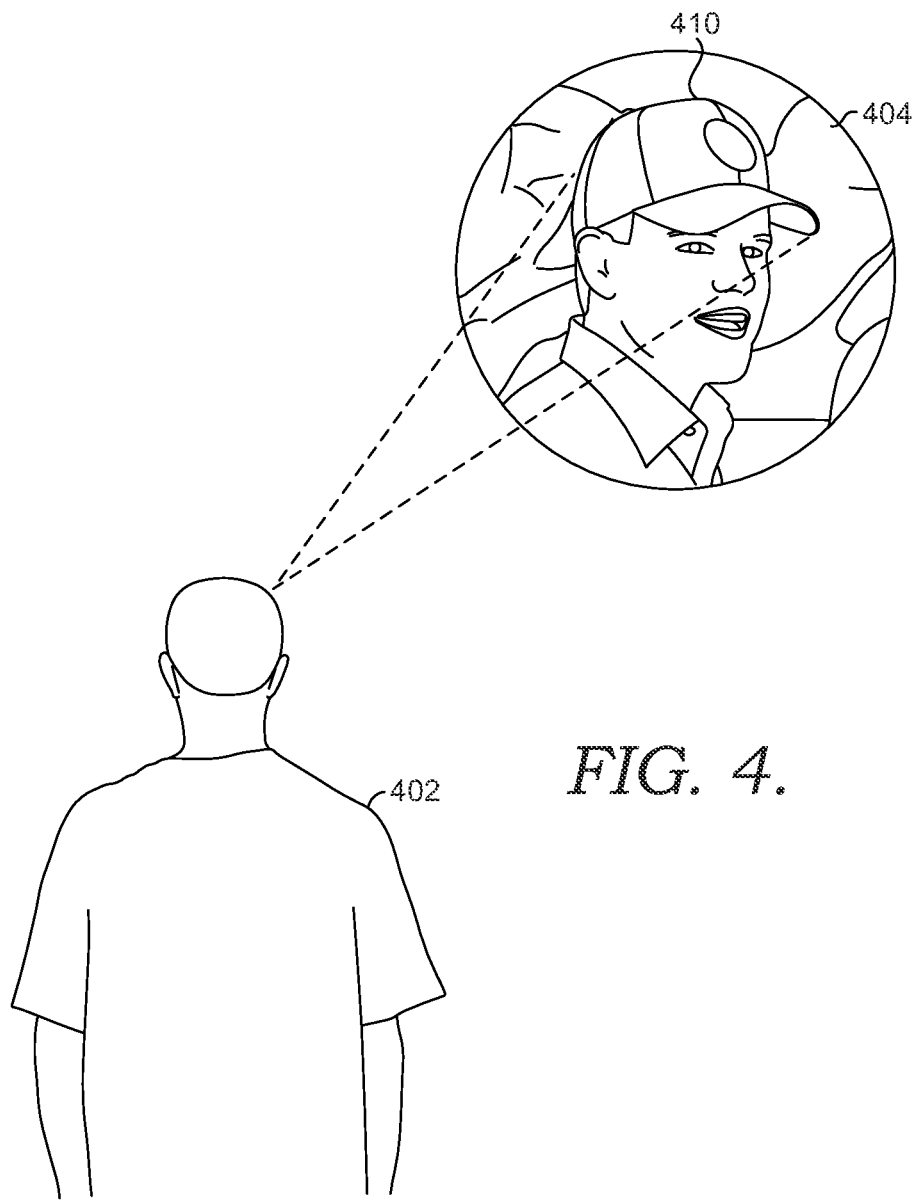
FIG. 4 is a schematic diagram that illustrates a user focus on a particular item within the media content, in accordance with embodiments of the present invention.
Figure 5:
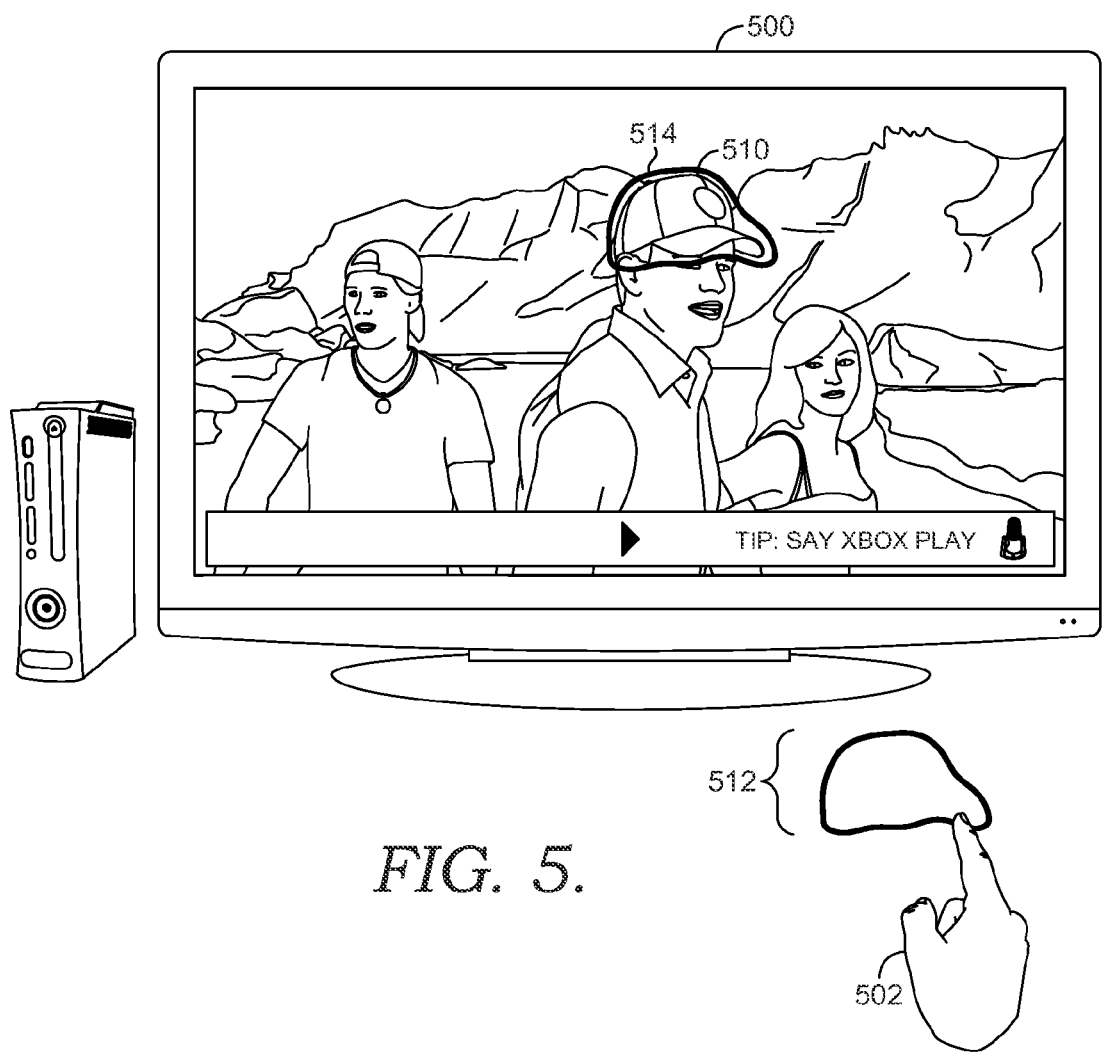
FIG. 5 is a schematic diagram of an example process of gesture-based tagging according to an embodiment of the present invention.

As illustrated in FIG. 4, the user 402 is interested in a particular item 410 within the media content 404. FIG. 5 illustrates an example process of gesture-based tagging, and illustrates an example tagging gesture 512 defining a region of the content 514 having a particular item 510 presented on the display 500. In the illustrated example, the tagging gesture 512 of the user 502 includes a shape that bounds or substantially bounds an item, such as an oval motion or a generally oval motion, a circular motion or a generally circular motion, or a freeform bounded motion.

In the illustrated example, a gesture tracing module of the user device can render a line representation of the region of content 514 of the tagging gesture on the display 500 in response to entry of the tagging gesture 512 by the user 502. The representation of the tagging gesture approximates the motion of the tagging gesture 512 entered by the user 502 and provides visual feedback to the user of the size and shape of the gesture that he/she just entered. As discussed above, other types of visual representations, such as highlighting and/or a magnifying lens may be used to identify the item to be tagged.

The region of content 514 having the item 510 may define the scope of the search and be used to formulate the search query. A shape substantially bounds a region even though the shape does not form a complete boundary around the region (e.g., there is a gap between starting and ending points of the shape, such that the shape is at least partially unbounded). In one example, a shape will be said to substantially bound a region if a gap in the boundary is less than a fraction of the total length of the gesture. In other embodiments, the tagging gesture may include a motion of any shape. In the case where the tagging gesture does not bound or substantially bound a region, the gesture may define the region of content as a region that is touched by, proximate to, overlapped by, or associated with the tagging gesture.

The item 510 displayed within the selected region of content 514 can be identified along with related tag-item data (e.g., using metadata associated with the content) and used to formulate a query. In response to completion of formulating the search query and/or or identifying tag-item data, the user device may automatically submit the search query and/or tag-item data to a search engine or search service. Additionally or alternatively, the user device may present the search query to the user on the display and ask the user to confirm and/or modify the search query. In other embodiments, the user device may present a plurality of potential search queries to the user and allow the user to select one of the plurality of search queries to use to conduct a search. In some embodiments, the user device may further allow the user to modify the search query or potential search queries presented on the display. The user device may submit the selected search query or the modified search query to the search engine or the search service.

Figure 6:
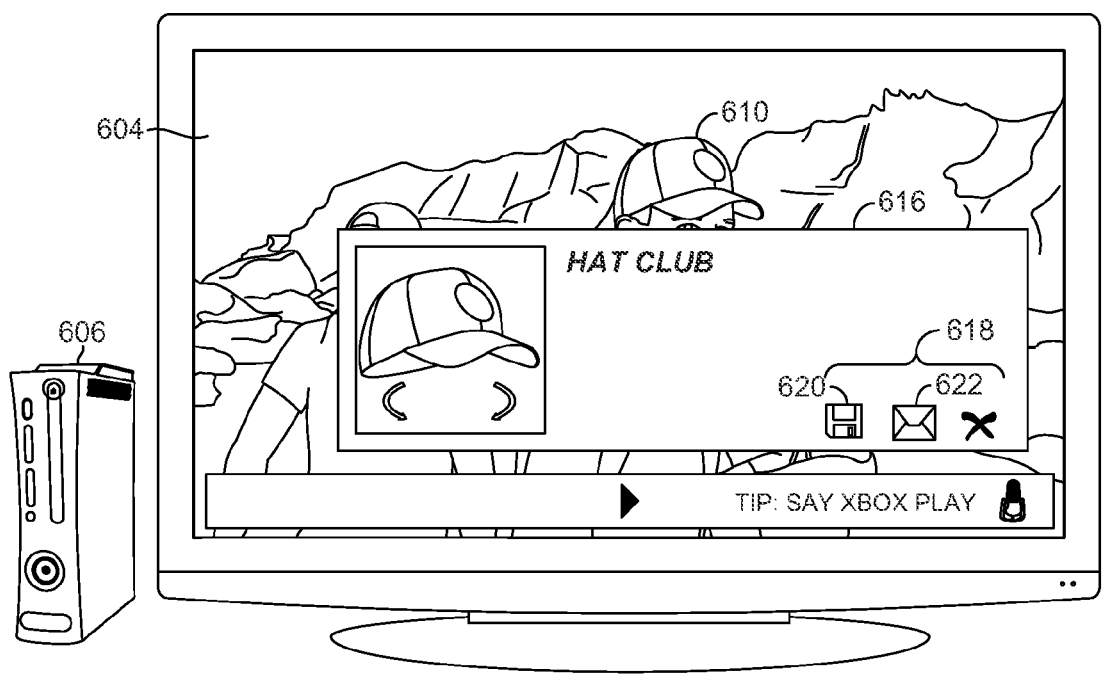
FIG. 6 is a schematic diagram of content related to an item being presented in association with the item, in accordance with embodiments of the present invention.

In one embodiment, the related-content system (e.g., search engine 222 of FIG. 2, recommendation engine 220 of FIG. 2, advertisement engine 224 of FIG. 2) may return content related to the selected item 510 to the user device which may then present the related content to the user. Upon receiving the related-content data from the related-content system 210, the user device 204 may present the related content on the display. Accordingly, as illustrated in FIG. 6, the user device 606 may display related-content data 616 that is content related to the tagging-enabled content 604. In FIG. 6, the related-content data 616 comprises an advertisement, but may any type of data. For example, the related content might be a suggested product, service, item; information relevant to the item; or the like.

In some implementations, the related content may be displayed immediately after the tagging gesture 512 of FIG.

5 is received. In one embodiment, the user device 606 may overlay the related-content data 616 on a portion of the displayed content 604. This allows the user to view the related content without exiting or minimizing an application or task with which the user was previously engaged. By way of example and not limitation, a slide out window including the related-content data may be overlaid on a portion of the displayed content. In some embodiments, the user device may overlay the related content on a portion of the displayed content that does not include the region of content defined by the tagging gesture. In one embodiment, the related content presented to the user may be a simplified version of the search results received from the related-content system. For example, the presented related-content data may include only a title, or a title and a limited number of characters.

Upon viewing the related content, the user may desire to broaden, narrow, refine, refocus, or otherwise alter a scope of the search. For example, a user may determine that the original tagging gesture did not encompass the item for which the user desired related information. In that case, the user may desire to broaden the search to include the intended item.

By way of example only, a scope of a search can be altered in response to detecting one or more new tagging gestures in addition to the original tagging gesture. For instance, the user can perform a second tagging gesture, which defines a second region of content to capture an intended item. The gesture detection module detects the second gesture, and instructs the gesture tracing module to output for display a second representation of the second region of content. The user device may then reformulate the search query and/or tag-item data based at least upon the first region of content and/or the second region of content. In some embodiments, information included in the first region of content and information included in the second region of content may be given the same weight or different weights in formulating a new search query. In other embodiments, the user device may use the information included in the second region of content to refine the search by searching a subset of results from within the original search results.

As shown in FIG. 6, the related-content data 616 can be displayed along with a set of one or more item actions 618. The item actions 618 provide the user with available actions that can be initiated or performed in association with the selected item. By way of example only, the item actions 618 associated with the selected item 610 include a saving action item 620 that, if selected, can save an indication of the item for later use (e.g., later purchase of the item, later viewing of the item, etc.). If selected, the sending action item 622 can send an indication of the item or related-content associated therewith. For example, upon selecting the sending action item 622, a "like" of the item can be posted to Facebook® or the item may be sent in an email to the user or other contacts, etc. In such an embodiment, the related-content system 210 or user device 204 of FIG. 2 may interpret the search query or tag-item data and identify a task the user may want to complete (e.g., make a reservation, purchase an item, etc.). The related-content system or user device may further interpret the search query and identify the task the user may want to complete based on context information related to the region of content having the item and/or based on user data. For example, the related-content system 210 may identify that the user looking for a location of a restaurant based on identifying the name of the restaurant in the search query and/or identifying the context information. For another example, the user device may receive and/or provide recommendations and/or advertisements based on the historical actions or tags initiated by the user.

Figure 7:
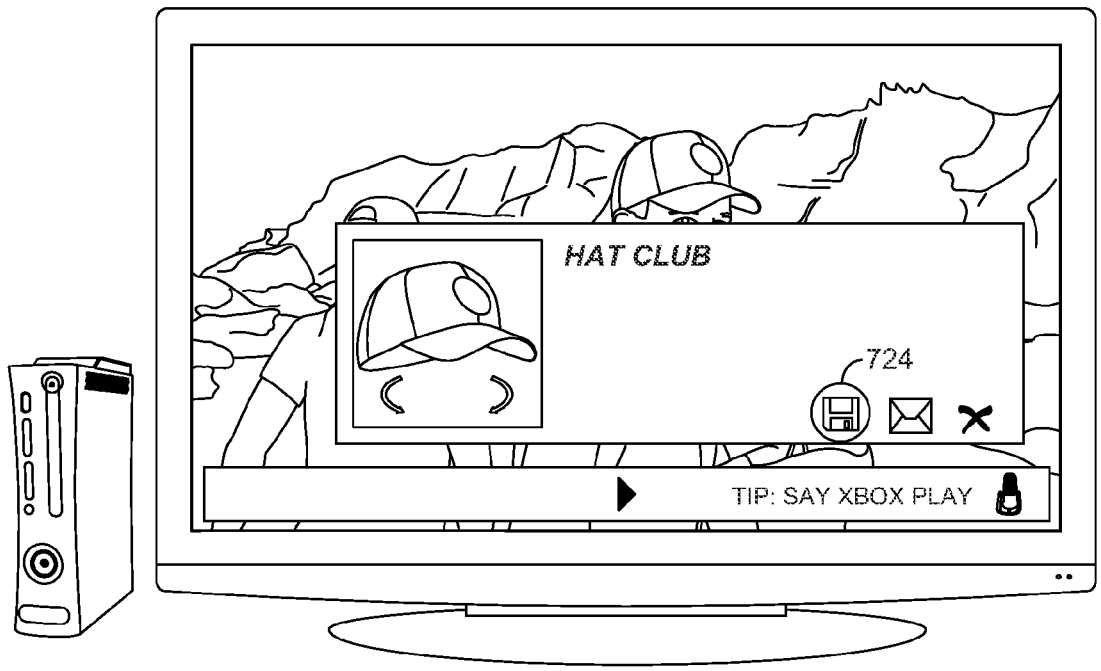
FIG. 7 is a schematic diagram of an example user selection of an item action according to an embodiment of the present invention.

FIG. 7 illustrates a user selection of the saving action item, as indicated by reference numeral 724. Such a selection can be performed in any number of ways. For example, a user can select an action item using any of the methods discussed above in reference to tagging gestures. Upon saving an item, or information associated therewith, the user can view the item or perform an action in association with the item at a later time.

Figure 8:
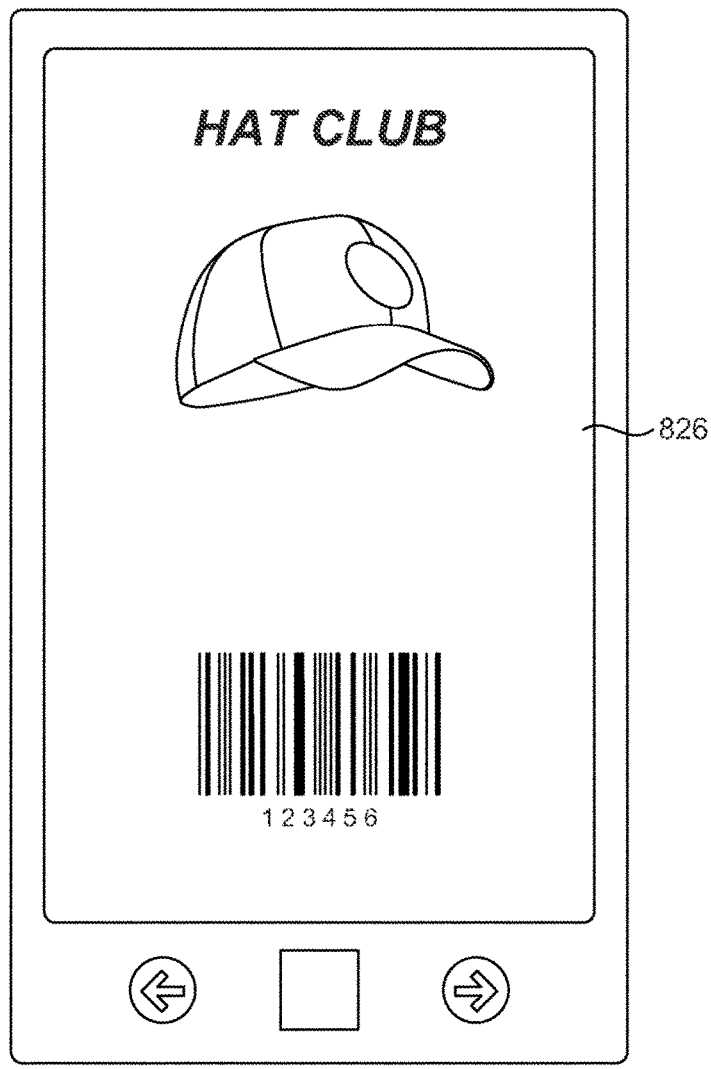
FIG. 8 is a schematic diagram of an example advertisement that can be viewed at a later time, in accordance with embodiments of the present invention.

For instance, as illustrated in FIG. 8, an advertisement 826, such as a coupon or deal, can be viewed and/or utilized at a later time (e.g., upon the user's viewing of the media content having the item). As can be appreciated, in embodiments, the user can access, view, or use the saved item or information associated therewith using any user device (e.g., a mobile device).

Figure 9:
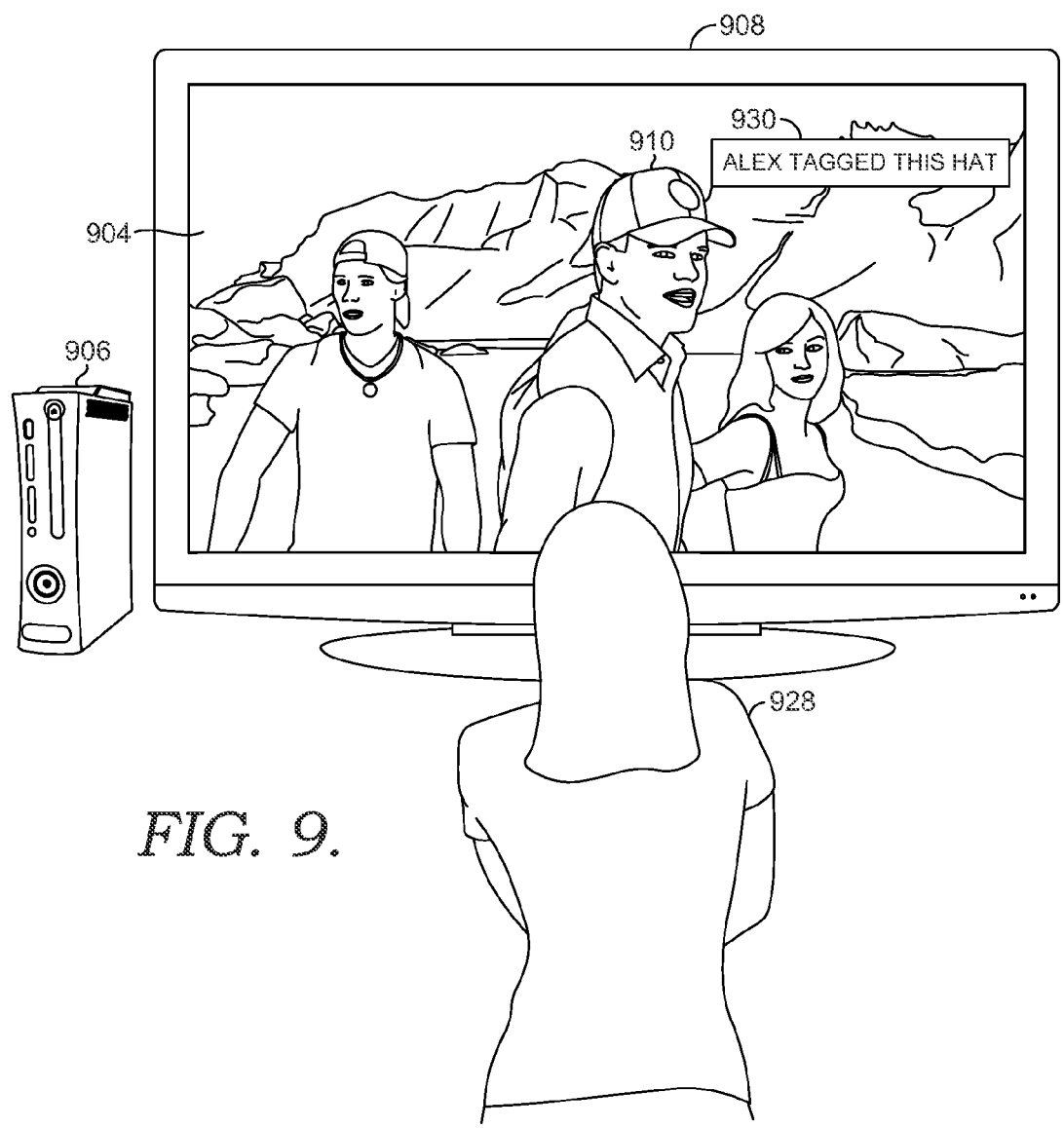
FIG. 9 is a schematic diagram of content related to an item tagged by another entity being presented in association with the item, in accordance with embodiments of the present invention.

Continuing with this example, upon detecting the tagging gesture 512 by the user 502 of FIG. 5 and, thereafter, tagging the item 510 associated with the tagging gesture 512, another individual or entity can view content related to the item. With reference to FIG. 9, assume that another user 928 (i.e., different from the user 502 that performed the tagging gesture 512) is viewing media content 904 that corresponds with the media content being viewed or that was previously viewed by the user 502. Further assume that the item 510 tagged by the user 502 of FIG. 5 is presented as item 910 to the user 928 within the media content 904. Upon recognizing that the item 510 within the media content 504 was tagged by the user 502 in FIG. 5 that is a network contact with the user 928, the user device 906 can present content 930 related to the item 910 for viewing by the user 928. Although FIG. 9 illustrates such related content 932 as an indication of the user(s) that initiated tagging of the item, such related content 930 can be any type of information. For example, the related content 930 presented to the user 928 based on the item 510 being selected by the user 502 of FIG. 5 might be a visual indication that the item was tagged in accordance with a tagging gesture (e.g., a highlighting of the item), content related to the item that is the same as the content presented to the user 502 (e.g., a same advertisement, recommendation, search result, or other related information), content related to the item that is different from the content presented to the user 502 (e.g., a different advertisement, a recommendation, a search result, or other related information), or the like.

Exemplary Methods

Exemplary methods for performing a gesture-based search are described with reference to FIGS. 10-16. These exemplary methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network or a communication cloud. In a distributed computing environment, computer executable instructions may be located both in local and remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual operations may be omitted from the methods without departing from the spirit and scope of the subject matter described herein. In the context of software, the blocks represent computer instructions that, when executed by one or more processors, perform the recited operations.

Figure 10:
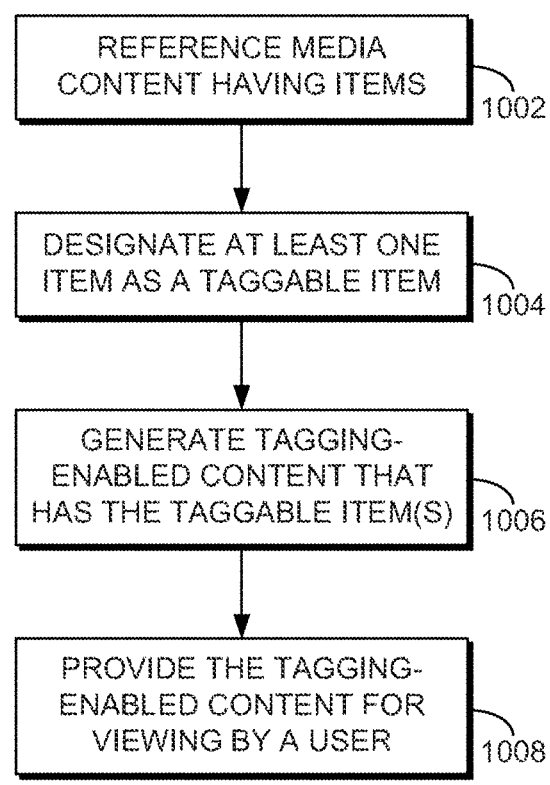
FIG. 10 illustrates an example method of generating tagging-enabled content, according to an embodiment of the present invention.

FIG. 10 illustrates an exemplary method 1000 of generating tagging-enabled content. The method 1000 is described in the context of the example content provider 202 of FIG. 2 for ease of illustration, but is not limited to being performed in such a context.

At block 1002, media content having items is referenced. The particular media content to reference might be based on, for example, a user's selection to view a specific media content, an automatic selection of a specific media content, or the like. The media content may be any media content having items, such as a video. At block 1004, at least one item is designated as a taggable item. At block 1006, tagging-enabled content that has the taggable item(s) is generated. The tagging-enabled content can be generated in any manner. For example, in one embodiment, metadata associated with the media content can be configured to include an indication of taggable items. At block 1008, the tagging-enabled content is provided for viewing by a user. In some embodiments, the tagging-enabled content is provided over a network to a user device such that the user of the user device can view the tagging-enabled content. Such tagging-enabled content can be provided at any time. For example, the tagging-enabled content might be stored in association with the content provider and provided to a user device based on a request from the user device to transmit the tagging-enabled content. The tagging-enabled content may be displayed within an application, such as a web browser or media player, at the user device.

Figure 11:
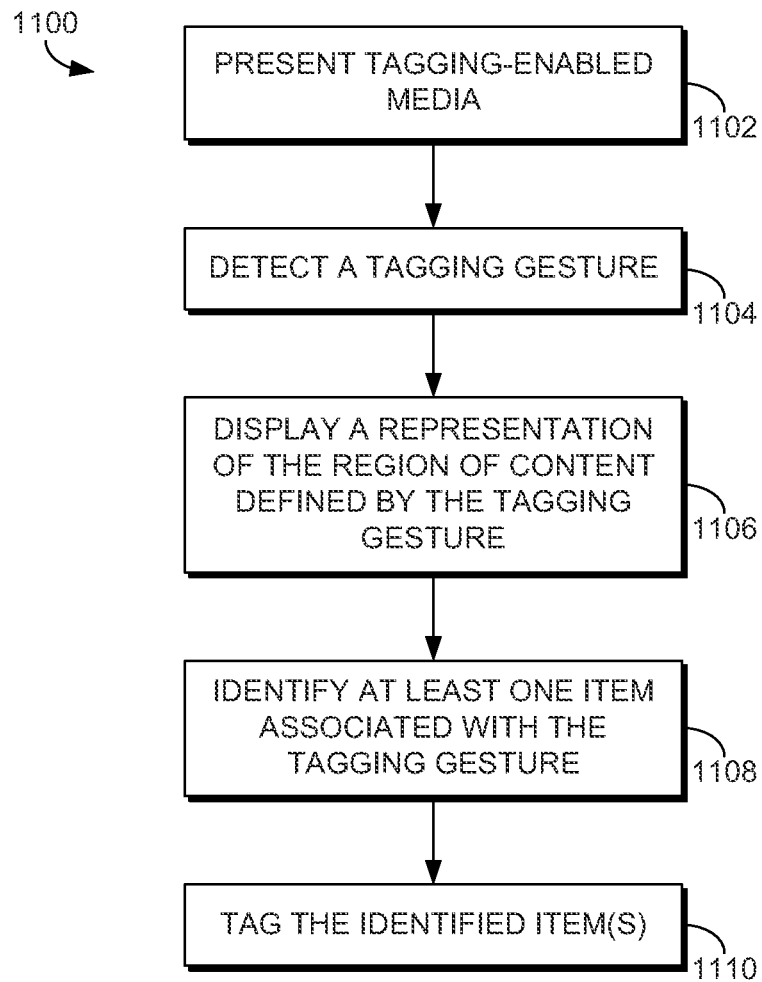
FIG. 11 illustrates an example method of tagging an item according to an embodiment of the present invention.

FIG. 11 illustrates an exemplary method 1100 of tagging an item. The method 1100 is described in the context of the example user device 204 of FIG. 2 for ease of illustration, but is not limited to being performed in such a context.

At block 1102, tagging-enabled media content is presented. In this regard, a user can view tagging-enabled content. In some cases, the tagging-enabled content might visually or audibly indicate an item available for tagging. For example, taggable items within the tagging-enabled content can be highlighted to indicate content related to such items can be presented. At block 1104, a tagging gesture indicating an item to be tagged is detected. In embodiments, the tagging gesture can define a region of content having an item of interest to the user. The tagging gesture may include a touch input on a touch screen or touch pad, a body motion detected by an image capture device, and/or a motion of a cursor controlled by a user input device. The item or region of content defined by the tagging gesture may include a region that is bounded or substantially bounded by the tagging gesture, a region that is touched by, proximate to, or overlapped by the tagging gesture. In one example, the tagging gesture may include a motion or a substantially circular motion that bounds or substantially bounds the item of interest.

In response to detecting the tagging gesture, at block 1106, a representation of the region of content defined by the tagging gesture may be displayed on the displayed content. The representation of the region of content may include a line enclosing the region of content, a highlighting view of the region of content, and/or a magnifying lens view of the region of content.

At block 1108, at least one item associated with the tagging gesture is identified. In this regard, an item of interest can be identified using metadata associated with the tagging-enabled media content. Such metadata might indicate taggable items at specific positions within the media content (e.g., frame, time, location, etc.). In this regard, the location of the tagging gesture might be matched with location of items as indicated in the metadata. In another embodiment, an item might be identified using an image recognition module (e.g., located at the user device or remote from the user device).

At block 1110, the identified item(s) is tagged. In this regard, an indication of a user interest in the selected item is indicated or designated. For example, in one embodiment, the metadata associated with the media content can indicate that a particular item is of interest. In another embodiment, an item can be indicated as tag separate from the metadata. The tagged item(s) can be used to view content related to the tagged item. In this regard, the user that initiated the tagged item or a third-party can view content related to the tagged item. Although method 1100 is described in the context of tagging items within media content, as previously discussed, a tagged item might be any item displayed on the display that is of interest to the user, such as an album title thumbnail, a movie poster thumbnail, etc.

Figure 12:
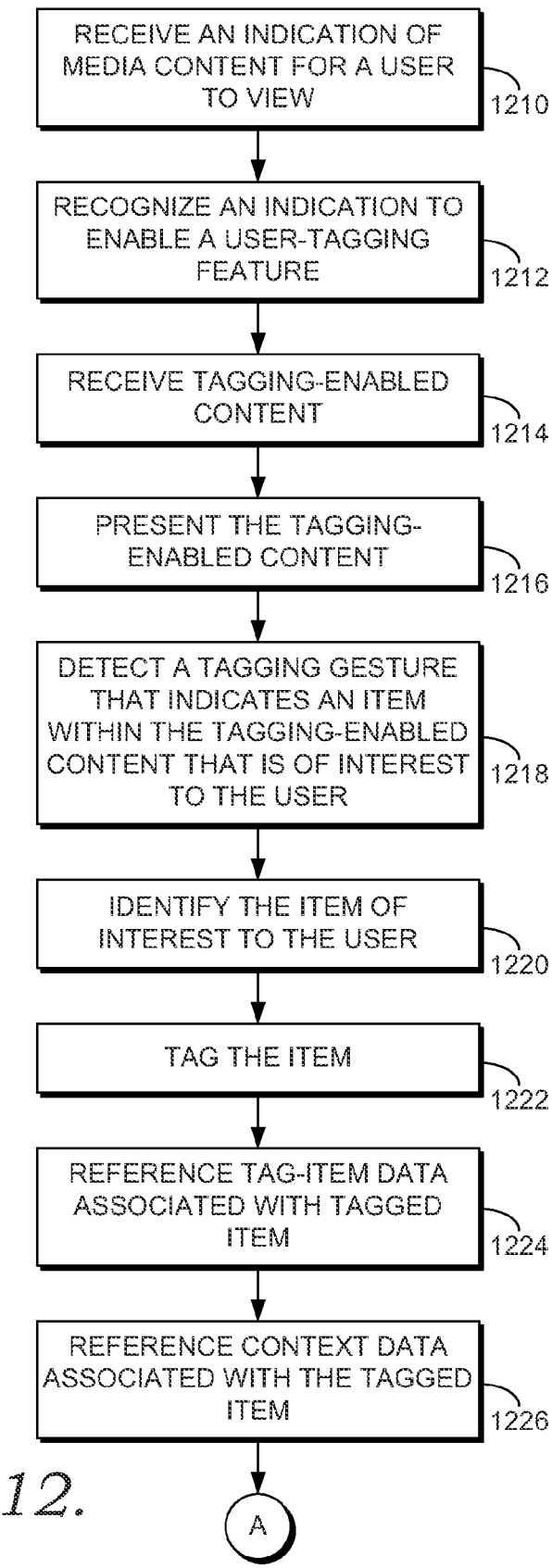
FIG. 12 illustrates an example method of utilizing gesture-based tagging to view content related to an item according to an embodiment of the present invention.
Figure 12:
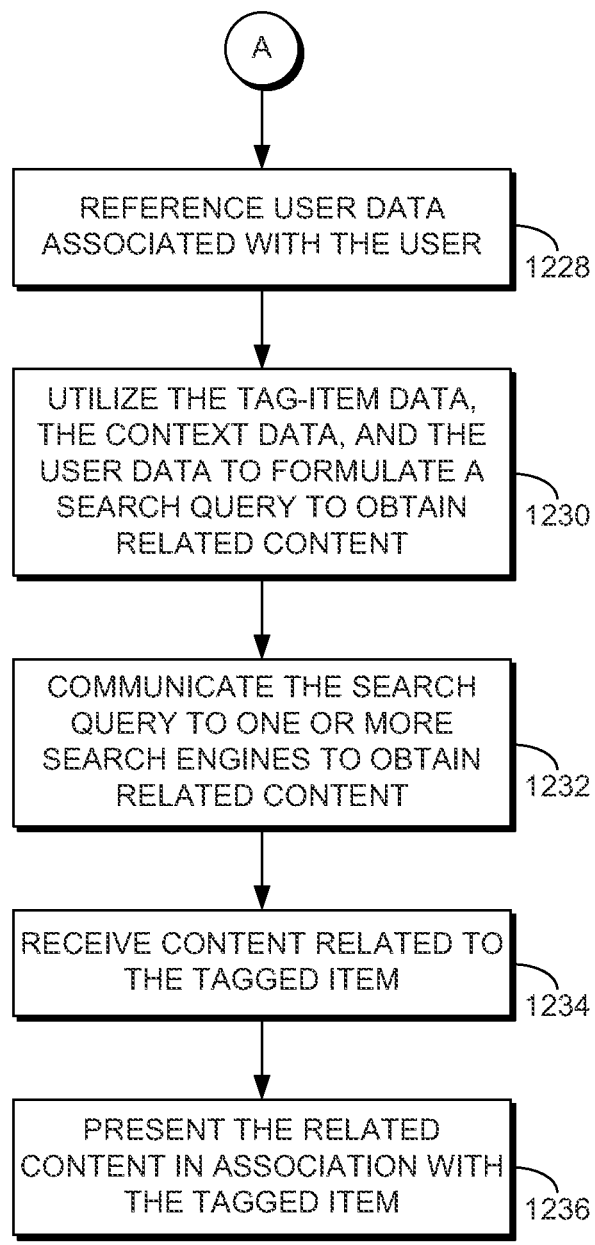

FIG. 12 illustrates an exemplary method 1200 of utilizing gesture-based tagging to view content related to an item. The method 1200 is described in the context of the example user device 204 of FIG. 2 for ease of illustration, but is not limited to being performed in such a context.

At block 1210, an indication to view media content is received. At block 1212, an indication to enable a user-tagging feature is recognized. The user-tagging feature enables the user to view content related to items of interest to the user. In some embodiments, a user can provide the indication to view media content and/or the indication to enable the user-tagging feature.

At block 1214, tagging-enabled content is received. The tagging-enabled content is presented at block 1216, for example, to the user via a user device. In some cases, the tagging-enabled content might visually or audibly distinguish which item or items within the media content are taggable. Subsequently, at block 1218, a tagging gesture is detected. The tagging gesture indicates an item within the tagging-enabled content that is of interest to the user. In this regard, a tagging gesture may indicate an item for which the user would like to view more information or perform an action (e.g., buy the item).

At block 1220, the item of interest to the user is identified. Such an item can be identified in any manner including, but not limited to, utilizing metadata associated with the presented tagging-enabled content, recognizing the image using image detection, or the like. At block 1222, the item selected or designated by the user is tagged. Accordingly, the selected item is designated as of interest to the user.

At block 1224, tag-item data associated with the tagged item is referenced. Such tag-item data can be referenced, for example, from the metadata associated with the presented tagging-enabled content, etc. At block 1226, context data associated with the tagged item is referenced. Context data may be any data indicating context of the tagged item. At block 1228, user data associated with the user is referenced.

Such user data may include, for example, an indication of the user, an indication of the user device, an indication of the user device location, or the like.

At block 1230, the tag-item data, the context data, and the user data are utilized to formulate a search query to obtain content related to the tagged item. In some embodiments, the search query is the referenced data (e.g., tag-item data, context data, and user data), or a portion thereof. The search query may be formulated based upon the region of content defined by the tagging gesture. The search query may be based on the content within the region and, possibly, context information and/or user data, which is relevant to a search. The context information may include content proximate to the region of content, metadata associated with the displayed content, etc.

At block 1232, the search query is communicated to one or more search engines to obtain related content. In one embodiment, the search query is communicated to the related-content system 210 of FIG. 2, which can utilize one or more search engines to identify content related to the item. In another embodiment, the search query is communicated to one or more specific engines, for example, based on a search engine(s) associated with a user preference of desired information, a determination of a specific engine(s), a default engine(s), or the like. A search using the search query may be automatically caused to be performed in response to completion of the tagging gesture. The search query may be sent to a remote search engine, which is separate the user device of the user. Additionally or alternatively, the search may be performed locally in the user device.

At block 1234, content related to the tagged item is received. Such related content can be provided from, for example, a recommendation engine, a search engine, an advertising engine, or the like.

Subsequently, at block 1236, the related content is presented in association with the tagged item. As such, the related content can be displayed on the display of the client device in association with the tagging-enabled content. In some cases, placement of the related content may be determined. For example, a user preference or default location (e.g., center or top of display screen) can be used to determine placement of search results. In another example, a preferred location for placement of search results may be near the item with which the related content is associated.

The related content may be displayed until a lapse of a time period and/or an occurrence of an event. By way of example and not limitation, related content may remain active or displayed on the display screen until a predetermined time period has lapsed without use of the related content (e.g., user viewing, selecting, etc.), until the user initiates an action associated with the related content (e.g., selects art item action such as purchasing the item, saving the item, or the like. By way of further example, a hide or collapse indication can be received, which effectively results in display of the original content without interrupting the user's viewing.

In some embodiments, the related content is displayed in association with one or more item actions. Such item actions might be identified at the user device or the related-content system. The item actions enable a user to initiate an action associated with the tagged item or related content.

Figure 13:
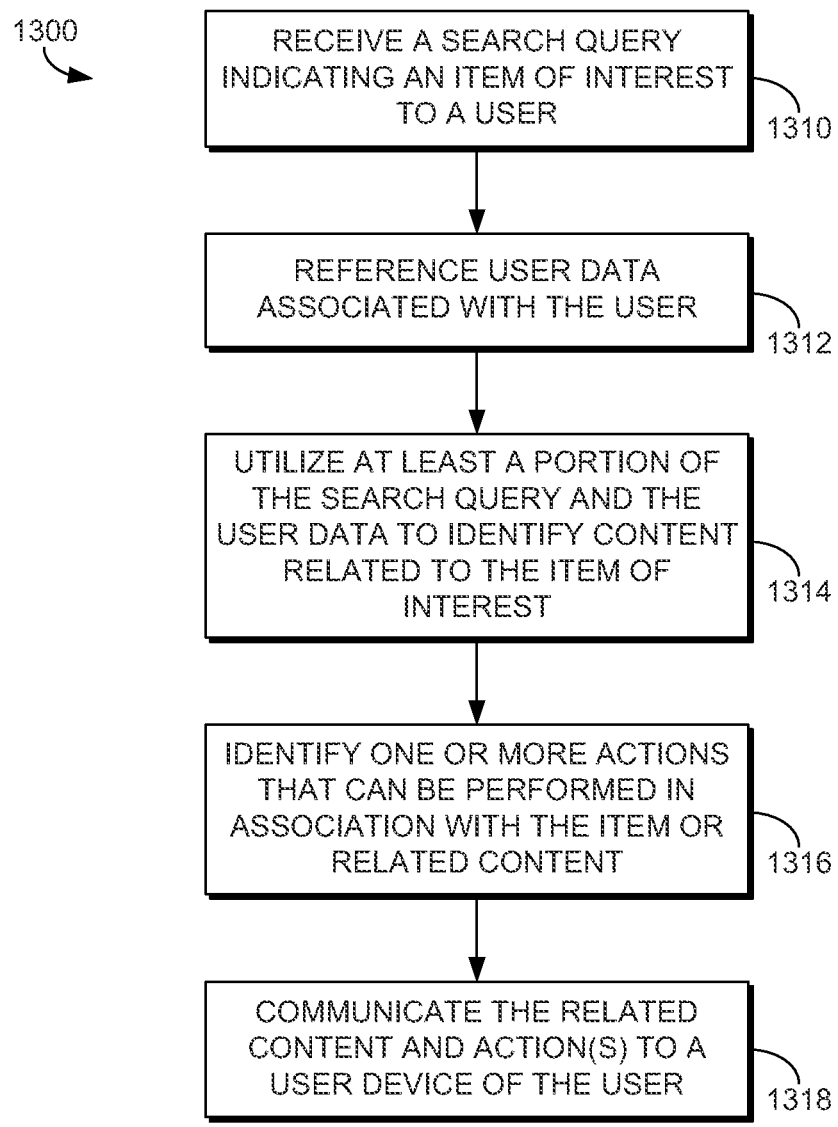
FIG. 13 illustrates an example method of utilizing gesture-based tagging to identify content related to an item, in accordance with an embodiment of the present invention.

FIG. 13 illustrates an exemplary method 1300 of utilizing gesture-based tagging to identify content related to an item. The method 1300 is described in the context of the example a search engine or search service, such as recommendation engine 220, search engine 222, or advertisement engine 224 of FIG. 2, but is not limited to being performed in such a context.

Initially at block 1310, a search query indicating an item of interest to a user is received from a user device. Such a search query may include or be formulated from tag-item data, context data, and/or user data. At block 1312, user data associated with the user is referenced. For instance, a data store containing user data can be used to identify user data associated with the user. At block 1314, at least a portion of the search query and the user data is utilized to identify, content related to the item of interest. In this regard, a data store containing data can be utilized to identify content related to the item of interest. At block 1316, one or more actions that can be performed in association with the item or the related content are identified. At block 1318, the related content and the one or more actions are communicated to the user device.

Figure 14:
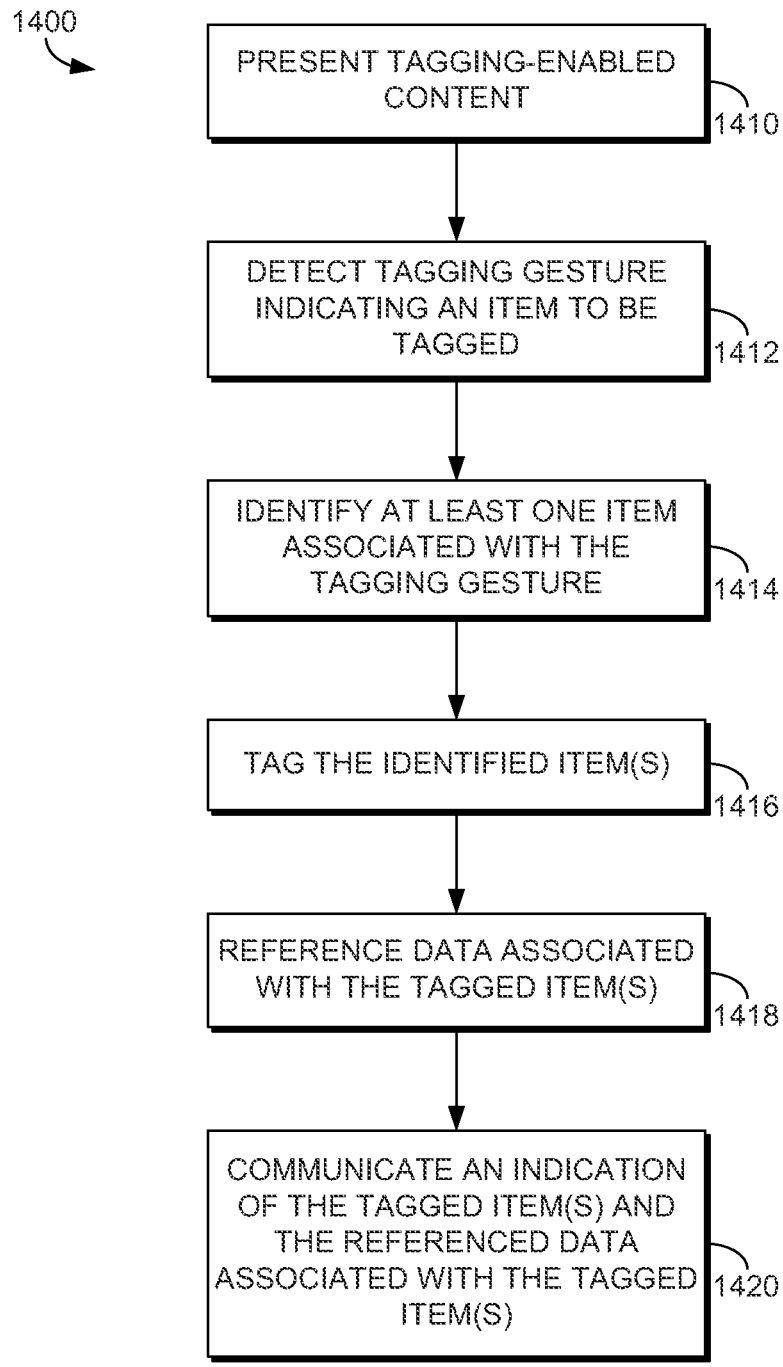
FIG. 14 illustrates an example method of a third-party initiating an item tagging such that another party can view content related thereto, according to an embodiment of the present invention.

FIG. 14 illustrates an exemplary method 1400 of a third-party initiating an item tagging such that another party can view content related thereto. The method 1400 is described in the context of the example network-contact device 208 of FIG. 2 for ease of illustration, but is not limited to being performed in such a context.

At block 1410, tagging-enabled media content is presented. In this regard, a third-party can view tagging-enabled content. In some cases, the tagging-enabled content might visually or audibly indicate an item available for tagging. For example, taggable items within the tagging-enabled content can be highlighted to indicate content related to such items can be presented. At block 1412, a tagging gesture indicating an item to be tagged is detected. In embodiments, the tagging gesture can define a region of content having an item of interest to the user. The tagging gesture may include a touch input on a touch screen or touch pad, a body motion detected by an image capture device, and/or a motion of a cursor controlled by a user input device. The item or region of content defined by the tagging gesture may include a region that is bounded or substantially bounded by the tagging gesture, a region that is touched by, proximate to, or overlapped by the tagging gesture. In one example, the tagging gesture may include a motion or a substantially circular motion that bounds or substantially bounds the item of interest.

At block 1414, at least one item associated with the tagging gesture is identified. In this regard, an item of interest can be identified using metadata associated with the tagging-enabled media content. Such metadata might indicate taggable items at specific positions within the media content (e.g., frame, time, location, etc.). In another embodiment, an item might be identified using an image recognition module (e.g., located at the user device or remote from the user device).

At block 1416, the identified item(s) is tagged. In this regard, an indication of a third-party interest in the selected item is indicated or designated. For example, in one embodiment, the metadata associated with the media content can indicate that a particular item is of interest. In another embodiment, an item can be indicated as a tag separate from the metadata.

At block 1418, data associated with the tagged item is referenced. Accordingly, tag-item data, item-context data, third-party data (e.g., identification of the third-party that tagged the item), or the like can be referenced, identified, or determined. At block 1420, an indication of the tagged item and the referenced data associated with the tagged item are communicated to a related-content system for processing such that another party can view content related to the tagged item.

Figure 15:
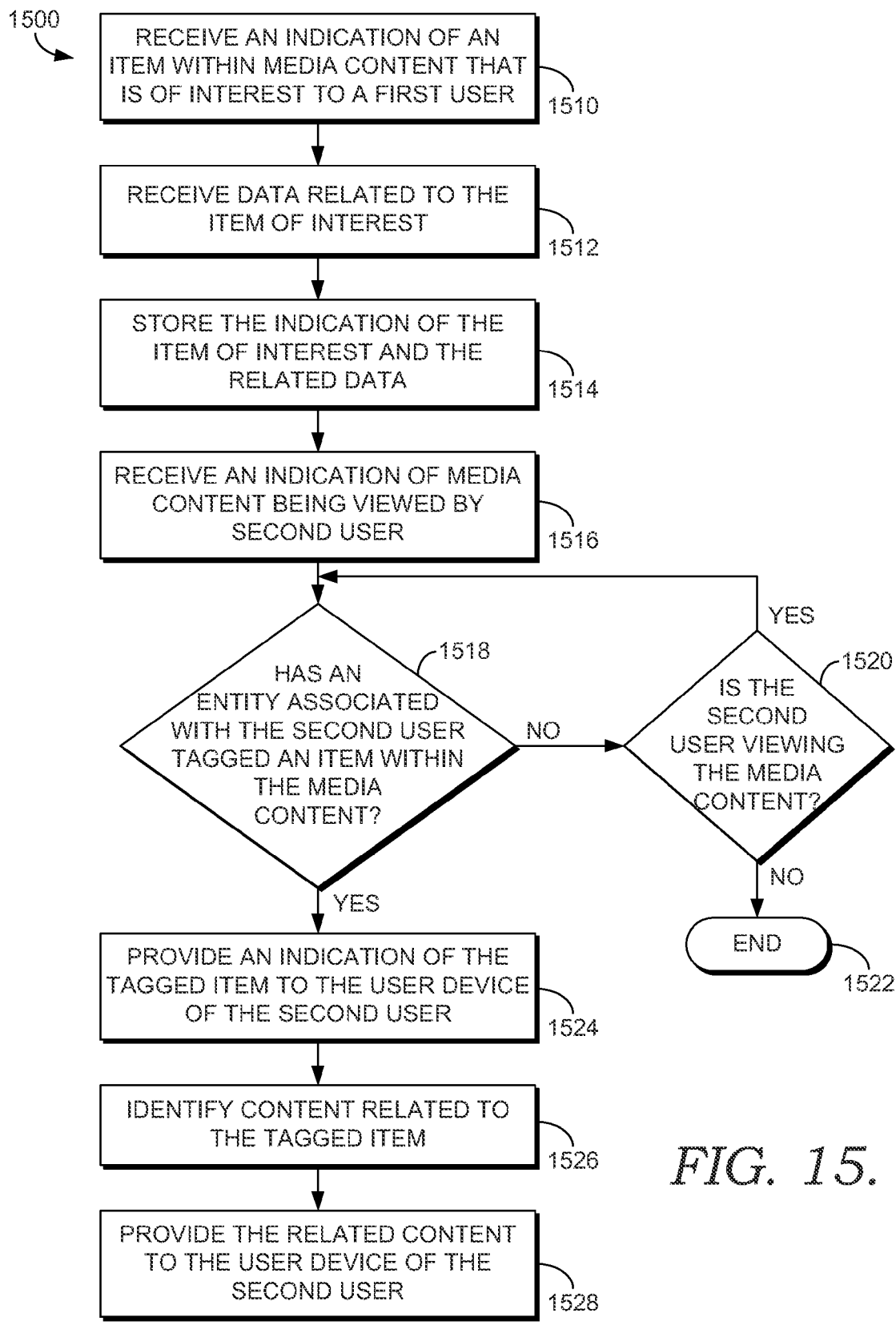
FIG. 15 illustrates an example method of utilizing third-party tagging to provide content related to an item to another party according to an embodiment of the present invention.

FIG. 15 illustrates an exemplary method 1500 of utilizing third-party tagging to provide content related to an item to another party. The method 1500 is described in the context of an example search engine or search service, such as social-network engine 226, recommendation engine 220, search engine 222, and/or advertisement engine 224 of FIG. 2, but is not limited to being performed in such a context.

Initially, at block 1510, an indication of an item within media content that is of interest to a first user is received. At block 1512, data related to the item of interest is received. Such data might be, for example, third-party data (e.g., an identification of the first user, an action initiated by the first user pertaining to the item of interest), tag-item data (e.g., an identification of the first user), item-context data, etc. At block 1514, the indication of the item of interest to the first user and the data related to the item of interest is stored or captured, for example, in association with the first user and/or the media content containing the item.

At block 1516, an indication of media content being viewed by a second user is received. Thereafter, it is determined if another entity associated with the second user has tagged an item within the media content, as indicated at block 1518. In some cases, such a determination may be made based on a relevant time frame, such as, for instance, has another entity tagged an item within a predetermined time frame (e.g., one week), since the previous time the second user viewed the media content, or the like. Further, in some implementations, a determination of an appropriate entity associated with the second user may be made. For instance, is the entity that performed the tagging gesture a preferred entity of which the second user is interested. Such preferences might be based on default data or preferences submitted by the user.

If another entity associated with the second user has not tagged an item within the media content, it is determined at block 1520 whether the second user continues to view the media content. If not, the method ends at block 1522. If so, the method returns to block 1518 to continue determining if another entity associated with the second user has tagged an item within the media content. Such a process enables notifying the second user of items tagged by another entity in real time.

On the other hand, if another entity associated with the second user has tagged an item within the media content, an indication thereof is provided to the user device of the second user. This is indicated at block 1524. At block 1526, content related to the item tagged by the other entity is identified. Such content may include data communicated from the device associated with the other entity (e.g., third-party data, tag-item data, item-context data) and/or data determined at the related-content system. For example, the related-content system can search for content related to the tagged item that may be of interest to the second user. As such, the related-content system might utilize user data associated with the second user to obtain content related to the tagged item that might be relevant to the second user. The content related to the tagged item is provided to the user device of the second user, as indicated at block 1528. Such related content may be, for example, an indication of the tagged item, an indication of the third party that initiated the item tagging, a suggestion or recommendation associated with the item, an advertisement associated with the item, etc.

Figure 16:
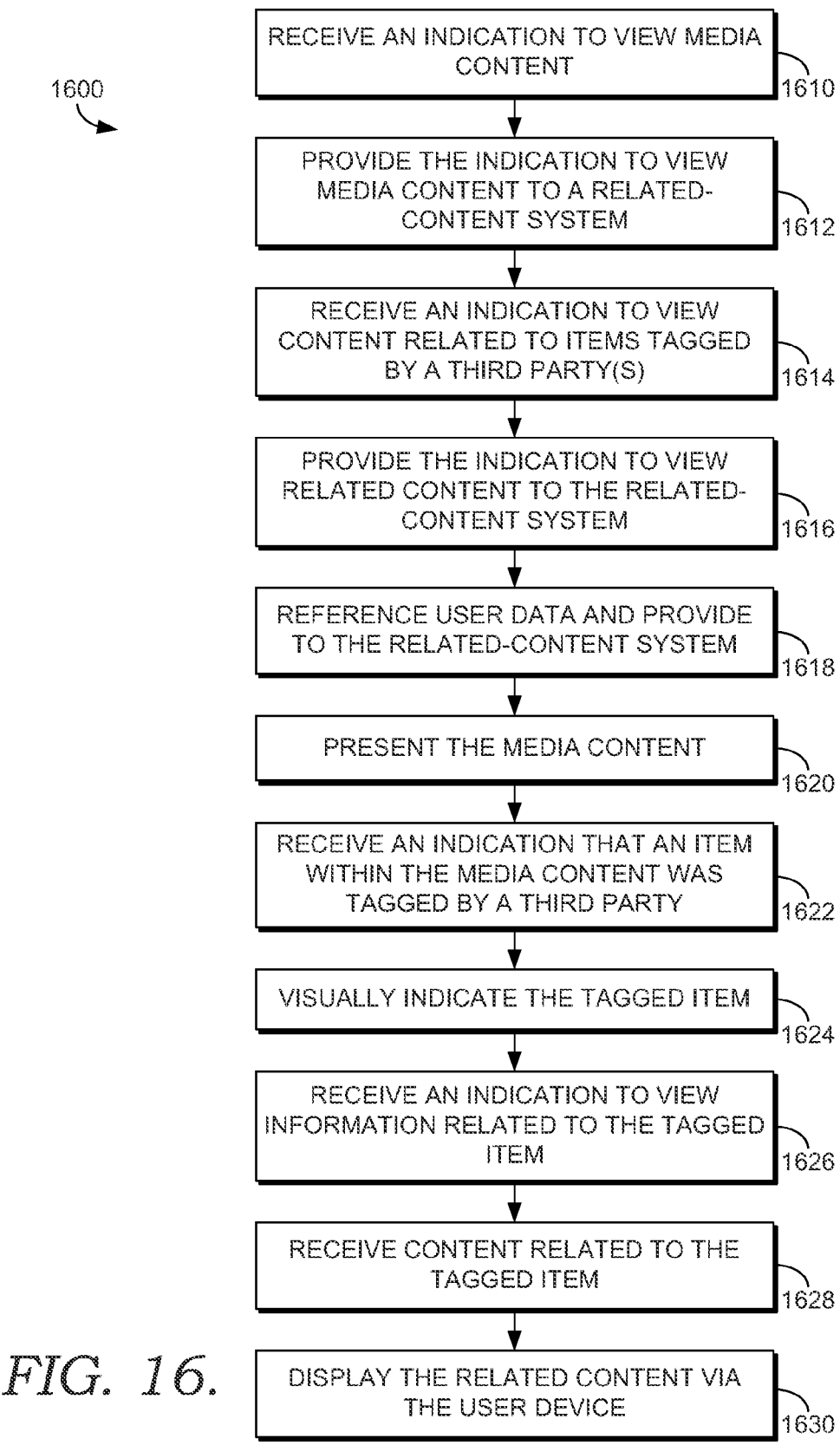
FIG. 16 illustrates an example method of utilizing third-party tagging to view related content on a user device, in accordance with an embodiment of the present invention.

FIG. 16 illustrates an exemplary method 1600 of utilizing third-party tagging to view related content on a user device. The method 1600 is described in the context of an example user device, such as user device 204 of FIG. 2, but is not limited to being performed in such a context.

Initially, at block 1610, an indication of media content to view is received. At block 1612, such an indication is provided to a related-content system. At block 1614, an indication to view content related to items tagged by a third party(s) is received. Subsequently, at block 1616, such an indication is provided to a related-content system. At block 1618, user data is referenced and provided to the related-content system. Such user data might include an indication of the user, an indication of the device being used by the user, an indication of the location of the device being used by the user, preferences associated with the user, items previously tagged by the user, etc.

The media content is presented, as indicated at block 1620. At block 1622, an indication of an item within the media content that was tagged by a third party is received. Thereafter, the item tagged by the third party is visually indicated as such in the media content being viewed by the user. This is indicated at block 1624. For example, the tagged item might be highlighted, blinking, colored, partially transparent, etc. At block 1626, an indication to view information related to the item is received. Such an indication can be provided, for example, by a user hovering a cursor or selector over the item or otherwise providing a selection or gesture in association with the item. In response to such an indication, at block 1628, content related to the item is received. Subsequently, the related content is displayed via the user device, as indicated at block 1630. The related content received and displayed can be, for example, an indication of the third party that tagged the item, a time at which the item was tagged, information related to the tagged item, an action performed by the third party in connection with the item, etc.

Although method 1600 describes receiving an indication to view content related to the item, as can be appreciated, any related content can be presented automatically without initially receiving a user indication to view such information. For example, rather than initially visually identifying a tagged item, related content might be initially displayed in association with the item such that it is readily apparent to the user without further action by the user. In some cases, a first portion of the related content might be displayed and, upon a user indication to view additional related content, a second portion of related content might be displayed. By way of example only, initially, an indication of the specific third party that tagged the item might be displayed (e.g., "Dan tagged this hat"). Upon a user hovering over the item the presented related content or otherwise making a selection, more details regarding the hat can be displayed (e.g., an advertisement for the hat; details pertaining to the hat, such as cost, brand, available colors, etc.; a recommendation of where to purchase the hat; a recommendation of other media content that contains the same or similar hat; or the like).

Any of the acts of any of the methods described herein may be implemented at least partially by a processor or other electronic device based on instructions stored on one or more computer-readable media. As can be appreciated, numerous embodiments of the methods described herein can be employed. The methods described herein are intended to be exemplary and not to limit the scope of the invention.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

The invention claimed is:

1. A computer-implemented method comprising:
   detecting, by a motion detection system coupled to a user device, a body motion of a user to determine a tagging gesture indicating a region within a media content displayed at the user device, the region including an item;
   based on determining the tagging gesture, providing for display at the user device a representation of the media content indicated by the body motion;
   based on the tagging gesture, at a processor of a computing device, identifying the item and determining the item is a tagged item;
   identifying tag-item data associated with the tagged item;
   in response to the tagging gesture, automatically initiating a search for content related to the tagged item, wherein the search is initiated based on a search query, wherein the search query is based on the identified tag-item data and user data, the user data comprising a history of previously tagged items that were tagged by the user associated with the tagging gesture;
   receiving the content related to the tagged item in response to the search query, wherein the received content related to the tagged item is based on the identified tag-item data and the user data; and
   causing a presentation of the content related to the tagged item, wherein the content related to the tagged item is presented in association with the tagged item.

2. The method of claim 1, further comprising causing an item action to be presented in association with the content related to the tagged item, wherein the item action comprises an indication of an action to be taken in connection with the tagged item.

3. The method of claim 2, wherein the item action is caused to be presented in response to a user selection of the content related to the tagged item.

4. The method of claim 2, wherein the content related to the tagged item comprises purchasing information associated with the tagged item and the content related to the tagged item is presented concurrently with the tagged item within the media content.

5. The method of claim 1, wherein the content related to the tagged item overlays the media content, and is presented adjacent to the tagged item.

6. The method of claim 1, wherein identifying the item comprises determining that metadata for a taggable item included in the media content corresponds to at least one of a time or a position within the media content that is associated with the tagged item.

7. The method of claim 1, wherein the item is identified based on an image recognition analysis for the item.

8. The method of claim 1, wherein identifying the item comprises:
   submitting an image of the item to an image search service; and
   receiving identifying information for the item from the image search service.

9. One or more computer-readable storage media storing instructions that, when executed by a processor, implement a method comprising:
   detecting, by a motion detection system coupled to a user device, a body motion of a user to determine a tagging gesture indicating a region within a media content displayed at the user device, the region including an item;
   based on determining the tagging gesture, providing for display at the user device a representation of the media content indicated by the body motion;
   based on the tagging gesture, identifying the item and determining the item is a tagged item;
   identifying tag-item data associated with the tagged item;
   in response to the tagging gesture, automatically initiating a search for content related to the tagged item, wherein the search is initiated based on a search query, wherein the search query is based on the identified tag-item data and user data, the user data comprising a history of previously tagged items that were tagged by the user associated with the tagging gesture;
   receiving the content related to the tagged item in response to the search query, wherein the received content related to the tagged item is based on the identified tag-item data and the user data; and
   causing a presentation of the content related to the tagged item, wherein the content related to the tagged item is presented in association with the tagged item.

10. The media of claim 9, wherein the search query is further based on context-item data, the context-item data comprising data associated with additional items included within the displayed media content.

11. The media of claim 9, wherein the displayed media content includes visual indications of taggable items, the taggable items comprising items for which related content is available based on tagging the taggable items.

12. The media of claim 9, wherein the tagging gesture comprises a motion corresponding to a shape that substantially bounds the item presented within the displayed media content.

13. The media of claim 9, wherein the content related to the tagged item further comprises an advertisement associated with the tagged item, a recommendation relevant to the tagged item, or information relevant to the tagged item.

14. The media of claim 9, wherein the user data further comprises:
   an identification of the user performing the tagging gesture;
   a location of the user device used by the user;
   an activity history of the user; and
   a user preference associated with the user.

15. The media of claim 9, wherein the content related to the tagged item includes a rotatable image of the item.

16. The media of claim 9, wherein the method further comprises causing a presentation of an item action in association with the content related to the tagged item, wherein the item action comprises an indication of an action to be taken in connection with the tagged item.

17. A computing system comprising:
   one or more processors; and
   computer storage memory having computer-executable instructions stored thereon that, when executed by the one or more processors, implement a method, the method comprising:
   detecting, by a motion detection system coupled to a user device, a body motion of a user to determine a tagging gesture indicating a region within a media content displayed at the user device, the region including an item;
   based on detecting the tagging gesture, providing for display at the user device a representation of the media content indicated by the body motion;

based on the tagging gesture, identifying the item and determining the item is a tagged item;

identifying tag-item data associated with the tagged item;

in response to the tagging gesture, automatically initiating a search for content related to the tagged item, wherein the search is initiated based on a search query, wherein the search query is based on the identified tag-item data and user data, the user data comprising a history of previously tagged items that were tagged by the user associated with the tagging gesture;

receiving the content related to the tagged item in response to the search query, wherein the received content related to the tagged item is based on the identified tag-item data and the user data; and causing a presentation of the content related to the tagged item, wherein the content related to the tagged item is presented in association with the tagged item.

18. The system of claim 17, wherein the method further comprises causing a presentation of an indication that a third party has indicated interest in an additional item presented within the displayed media content.

19. The system of claim 18, wherein the indication that the third party has indicated interest in the additional item comprises an identification of the third party and an indication that the third party previously tagged the additional item, wherein the indication is presented as the additional item is presented within the displayed media content.

20. The system of claim 18, wherein the indication that the third party has indicated interest in the additional item comprises an indication that the third party purchased the additional item.

* * * * *